United States Patent
Hori et al.

(10) Patent No.: US 7,835,839 B2
(45) Date of Patent: Nov. 16, 2010

(54) DRIVE-PERMISSION APPARATUS

(75) Inventors: Masashi Hori, Anjo (JP); Masaaki Shinojima, Nagoya (JP); Kiyoshi Kimura, Obu (JP); Haruki Matsuzaki, Obu (JP); Tomoyuki Kashiwagi, Chita-gun (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 1280 days.

(21) Appl. No.: 11/349,349

(22) Filed: Feb. 8, 2006

(65) Prior Publication Data

US 2006/0201768 A1 Sep. 14, 2006

(30) Foreign Application Priority Data

Feb. 10, 2005 (JP) .............................. 2005-035050

(51) Int. Cl.
*F16D 27/00* (2006.01)
(52) U.S. Cl. ..................... 701/51; 192/84.1; 318/647; 324/207.25; 324/207.2; 324/207.21
(58) Field of Classification Search ............... 192/84.1; 701/51
See application file for complete search history.

(56) References Cited

U.S. PATENT DOCUMENTS

| | | | |
|---|---|---|---|
| 5,454,768 A * | 10/1995 | Jones et al. | 477/83 |
| 5,704,457 A * | 1/1998 | Kimura et al. | 192/220.2 |
| 6,105,448 A * | 8/2000 | Borschert et al. | 74/335 |
| 6,230,576 B1 * | 5/2001 | Yamada et al. | 74/335 |
| 6,546,348 B2 * | 4/2003 | Kusafuka et al. | 702/96 |
| 6,581,488 B2 * | 6/2003 | Miyazaki et al. | 74/335 |
| 6,589,131 B2 * | 7/2003 | Miyata et al. | 477/34 |
| 6,589,133 B2 * | 7/2003 | Kusafuka et al. | 477/97 |
| 6,835,163 B2 * | 12/2004 | Eggleton | 477/115 |
| 2003/0042053 A1 * | 3/2003 | Yoshikawa et al. | 180/65.1 |
| 2003/0078701 A1 * | 4/2003 | Sunami et al. | 701/1 |
| 2003/0227287 A1 * | 12/2003 | Hori et al. | 324/207.25 |
| 2004/0072646 A1 * | 4/2004 | Hori et al. | 475/149 |

(Continued)

FOREIGN PATENT DOCUMENTS

JP 05-322031 12/1993

(Continued)

OTHER PUBLICATIONS

German Examination Report dated Jul. 14, 2009, issued in corresponding German Application No. 10 2006 000 058.7-14, with English translation.

(Continued)

*Primary Examiner*—Khoi Tran
*Assistant Examiner*—Kyung J Kim
(74) *Attorney, Agent, or Firm*—Nixon & Vanderhye P.C.

(57) ABSTRACT

An ECU controls a starter relay. Output angle detector detects a rotational angle of an output shaft in a rotary actuator. The ECU stores a first rotational angle which is detected by the output angle detector when a starting switch is OFF. When the starting switch is ON and when the difference between a second rotational angle detected at that time by the output angle detector and the first rotational angle already stored is not within a certain value, the ECU inhibits the operation of the starter relay to inhibit engine start.

15 Claims, 12 Drawing Sheets

U.S. PATENT DOCUMENTS

2004/0212249 A1* 10/2004 Yamaguchi et al. .... 303/122.04
2005/0146302 A1*  7/2005 Kamio et al. ............... 318/647

FOREIGN PATENT DOCUMENTS

| JP | 2000-081910 | 3/2000 |
|---|---|---|
| JP | 2001-271917 | 10/2001 |
| JP | 2002-323127 | 11/2002 |
| JP | 2004-100813 | 4/2004 |
| JP | 2004-324849 | 11/2004 |
| JP | 2004-036406 | 2/2005 |

OTHER PUBLICATIONS

German Office Action (with English translation) dated Mar. 30, 2007.
Japanese Office Action dated Sep. 2, 2008 issued in counterpart Japanese Application 2005-035050 with English translation.
Office Action dated Mar. 26, 2010 issued in corresponding Japanese Application No. 2005-35050 with an at least partial English-language translation thereof.

* cited by examiner

DRIVE-PERMISSION APPARATUS

CROSS REFERENCE TO RELATED APPLICATIONS

This application is based on Japanese Patent Applications No. 2005-35050 filed on Feb. 10, 2005 the disclosure of which is incorporated herein by reference.

FIELD OF THE INVENTION

The present invention relates to a drive-permission apparatus. Particularly, the present invention is concerned with a technique suitable for use in an apparatus wherein the operation of a motor-driven actuator (a rotary actuator) is controlled in accordance with a command signal (e.g., a command signal issued by operating means or by control means).

Specifically, the present invention pertains to a technique suitable for use in an apparatus wherein operating means (e.g., a shift lever) and a drive object (e.g., a shift range switching mechanism) which executes the contents of operation performed by the operation means are not mechanically connected with each other.

BACKGROUND OF THE INVENTION

As an example of the background technique related to the present invention, reference will be made below to a shift range switching system wherein a shift range switching mechanism in a vehicular automatic transmission is operated by a rotary actuator using an electric motor.

In this type of a shift range switching system, in accordance with a shift range switching command (set by an occupant) issued by shift range setting means (e.g., a shift lever, a shift range setting button, or a joy stick), the rotational direction, speed, quantity and angle of an electric motor are controlled to switch an actual shift range (an actual shift range in an automatic transmission) in a shift range switching mechanism.

According to this construction, since there is no mechanical connection between the shift range setting means and the shift range switching mechanism, the freedom of on-board installation of the shift range setting means and the shift range switching mechanism is increased.

When there is a mechanical connection between the shift range setting means and the shift range switching mechanism, the shift range switching command set by the shift range switching means and the actual shift range in the shift range switching mechanism coincide with each other positively unless the mechanical connection is damaged.

However, when there is no mechanical connection between the shift range setting means and the shift range switching mechanism, it is likely that the shift range switching command set by the shift range setting means and the actual shift range in the shift range switching mechanism may not be coincident with each other by some unexpected cause.

When the shift range switching command and the actual shift range do not coincide with each other, it is likely that the vehicle may start at the time of start-up of the engine despite the driver having an understanding that the vehicle will not start. In this case, driver has a sense of incongruity. Therefore, in a shift range switching system wherein there is no mechanical connection between shift range setting means and a shift range switching mechanism, it is necessary to prevent an unintended starting of the vehicle at the time of start-up of the engine even when there occurs any unexpected factor.

JP 2002-323127A shows a shift range switching system in which an actual shift range (the last-time shift range) at the time of stopping an engine is stored in a non-volatile memory or the like and, when starting the operation of the engine, "the last-time shift range" which has been stored at the time of engine stop is made the present "actual shift range."

In this shift range switching system, when an output shaft rotates while a rotary actuator is once dismounted for maintenance or the like, it is likely that "the last-time shift range" stored in memory and "actual shift range" after maintenance and mounting may be different from each other. Thus, even when "the last-time shift range" stored in memory is "N" or "P" range, the present "actual shift range" may be another shift range (e.g., such a vehicular travel range as R, "D", 2, or L). Therefore, when there is made control for replacing "the last-time shift range" with "actual shift range" at the time of start-up of the engine, it is necessary to take a measure for preventing an unintended starting of the vehicle.

SUMMARY OF THE INVENTION

The present invention has been accomplished in view of the above-mentioned problems and it is an object of the invention to provide a drive-permission apparatus for controlling the operation of a motor-driven rotary actuator in accordance with a command signal (e.g., a command signal issued by operating means or by control means) which apparatus can prevent the occurrence of unexpected operation of an object apparatus.

According to the present invention, even in the case of an apparatus wherein a shift lever and a shift range switching mechanism which executes the contents of operation of the shift lever are not mechanically connected with each other, unexpected starting of a vehicle is not performed at the time of start-up of an engine.

According to the drive-permission apparatus of the present invention, when a command for the start of operation of a permission object apparatus is given and when the difference between this-time angle of the motor-driven rotary actuator detected by angle detecting means and the last-time angle of the motor-driven rotary actuator stored in memory means does not satisfy a predetermined condition (e.g., coincidence between the last-time angle and this-time angle or the difference between the last-time angle and this-time angle is within a predetermined value), drive inhibiting means inhibits the start of operation of the permission object apparatus.

With such means, even in the case of an apparatus wherein the operation of a rotary actuator is controlled in accordance with a command signal, the start of operation of the permission object apparatus is inhibited when the difference between this-time angle and the last-time angle does not satisfy the predetermined condition. Therefore, when a command for the start of operation is given, it is possible to prevent the occurrence of unexpected operation of the permission object apparatus.

DETAILED DESCRIPTION OF EMBODIMENT

First Embodiment

In this first embodiment the drive-permission apparatus of this embodiment is applied to a vehicle on which is installed a shift range switching system in a vehicular automatic transmission. Reference will be made first to the shift range switching system.

Figure 2:
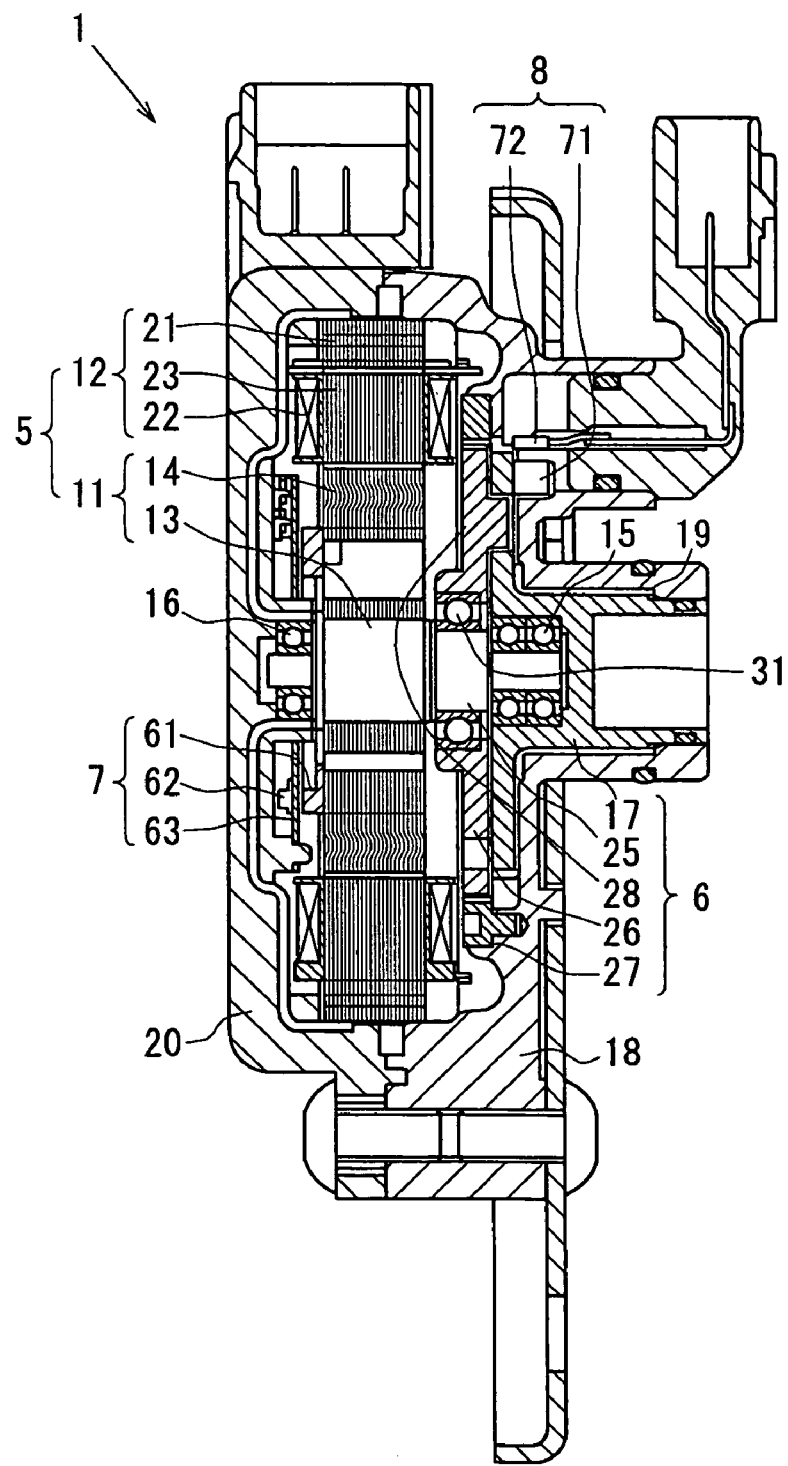
FIG. 2 is a sectional view of a rotary actuator.
Figure 3:
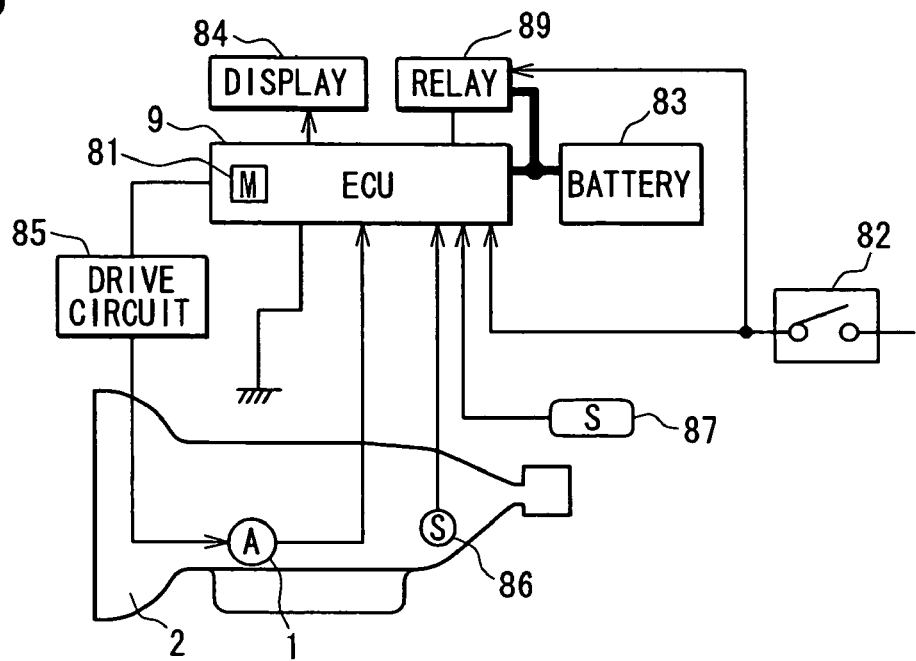
FIG. 3 is a system configuration diagram of a shift range switching system.

The shift range switching system includes a rotary actuator 1 (see FIG. 2; an example of a motor-driven actuator) to operate a shift range switching mechanism 3 (including a parking switching mechanism 4; see FIG. 4; an example of a drive object) mounted in a vehicular automatic transmission 2 (see FIG. 3).

The rotary actuator 1, which is a servo mechanism for driving the shift range switching mechanism 3, includes a synchronous electric motor 5, a reduction gear 6 for reducing a rotational output of the electric motor 5 and driving the shift range switching mechanism 3, an encoder 7 for detecting a rotational angle of the electric motor 5, and output angle detecting means (an example of angle detecting means and actual shift range detecting means) 8 for detecting an output angle (a rotational angle of an output shaft 17 to be described later; an actual shift range) of the reduction gear 6. The electric motor 5 drives the shift range switching mechanism 3 through the reduction gear 6. The rotation of the electric motor 5 is controlled by an ECU (electric control unit; an example of motor control means) 9.

In the shift range switching system, the rotational direction, speed, quantity and angle of the electric motor 5 are controlled by ECU 9, thereby controlling the operation of the shift range switching mechanism 3 which is driven through the reduction gear 6. In accordance with this control the shift range switching mechanism 3 switches the actual shift range in the automatic transmission 2.

This first embodiment will be described below on the assumption that, in FIG. 2, the right side is front and the left side is rear.

The electric motor 5 used in this first embodiment is a brushless SR motor (switched reluctance motor) not using a permanent magnet and is made up of a rotor 11 supported rotatably and a stator 12 disposed coaxially with the rotational center of the rotor 11.

The rotor 11 is made up of a rotor shaft 13 and a rotor core 14. The rotor shaft 13 is supported rotatably by rolling bearings (a front rolling bearing 15 and a rear rolling bearing 16) which are disposed at front end rear ends, respectively, of the rotor shaft.

The front rolling bearing 15 is fitted and fixed in an inner periphery of an output shaft 17 of the reduction gear 6. The output shaft 17 of the reduction gear 6 is supported rotatably by a metal bearing 19 which is disposed on an inner periphery of a front housing 18. That is, the front end of the rotor shaft 13 is supported rotatably through the metal bearing 19 provided in the front housing 18 →output shaft 17→front rolling bearing 15.

On the other hand, the rear rolling bearing 16 is press-fitted and fixed in an outer periphery of the rear end of the rotor shaft 13 and is supported by a rear housing 20.

The stator 12 is made up of a fixed stator core 21 and exciting coils 22 of plural phases which, when energized, generate a magnetic force.

The stator core 21 is formed by laminating a large number of thin plates and is fixed to the rear housing 20. The stator core 21 is provided with stator teeth 23 (inward salient poles) formed at intervals of 30° toward the inside rotor core 14. Coils U, V, and W are wound round the stator teeth 23 to generate a magnetic force in each of the stator teeth 23.

The exciting coils 22 will now be described in detail with reference to FIGS. 5 and 6.

Figure 5:
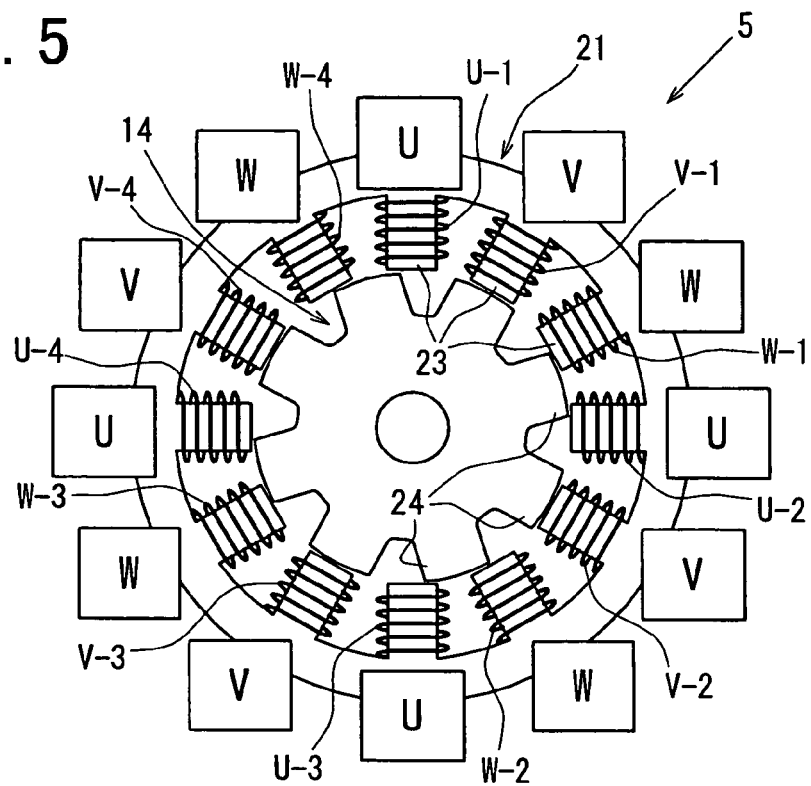
FIG. 5 is a schematic configuration diagram of an electric motor.
Figure 6:
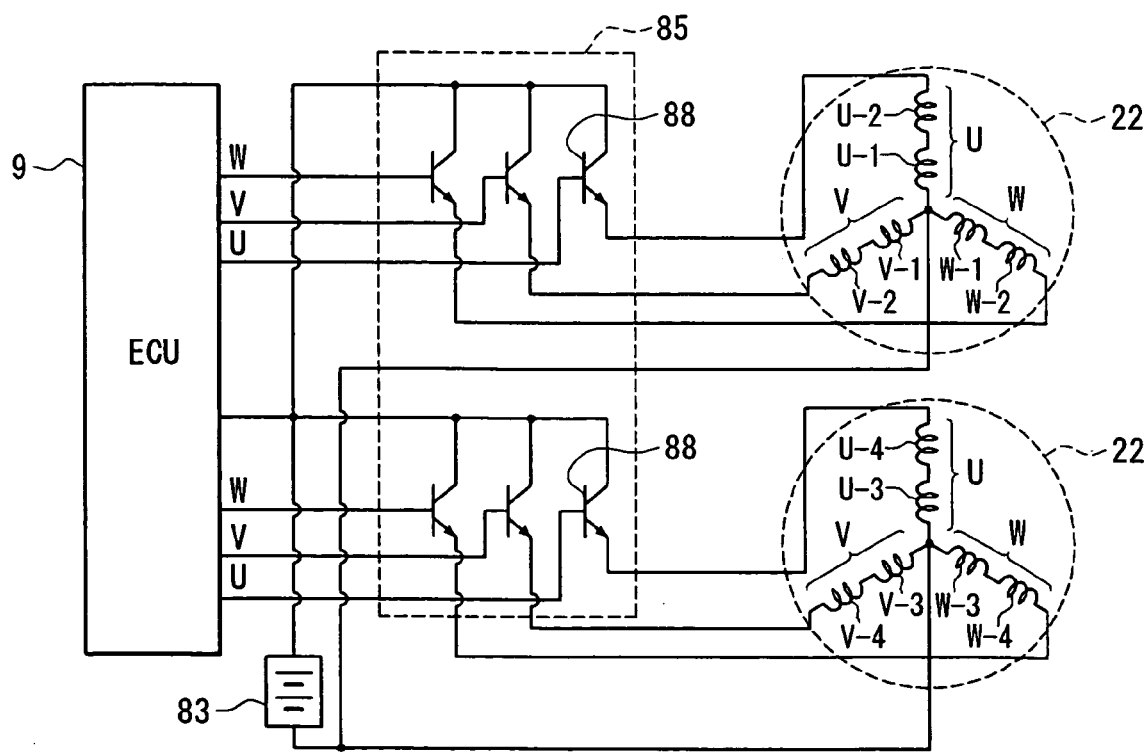
FIG. 6 is a power supply circuit diagram for the electric motor.

In each exciting coil 22, as shown in FIGS. 5 and 6, coils U, V, and W are wound electrically independently and are star-connected.

More specifically, the coils U, V, and W are mounted respectively to the stator teeth 23 which are continuous successively in the rotational direction. When the energizing coils 22 are energized, the coils U, V, and W create opposite poles at each stator teeth. For example, when inner ends of "coils U-1, W-1, V-2, U-3, W-3, V-4" create N poles, inner ends of "V-1, U-2, W-2, V-3, U-4, W-4" adjacent thereto create S poles.

Thus, for example when coils U-1, U-2, U-3, and U-4 are energized, an inside diameter portion of one stator teeth 23 (one of two stator teeth 23 located at 90° shifted positions in the rotational direction) with coils U-1 and U-3 mounted thereon becomes N pole, while an inside diameter portion of the other stator teeth 23 with coils U-2 and U-4 mounted thereon becomes S pole.

The rotor core 14 is formed by laminating a large number of thin plates and is press-fitted and fixed in the rotor shaft 13. The rotor core 14 is provided with rotor teeth 24 (outward salient poles) which are projected at intervals of 45° toward the stator core 21 located on the outer periphery side.

By switching in order the energizing position and direction of the exciting coils 22 of U, V, and W phases, the stator teeth 23 which attracts the rotor teeth 24 magnetically are switched in order to rotate the rotor 11 in one or opposite direction.

Figure 7:
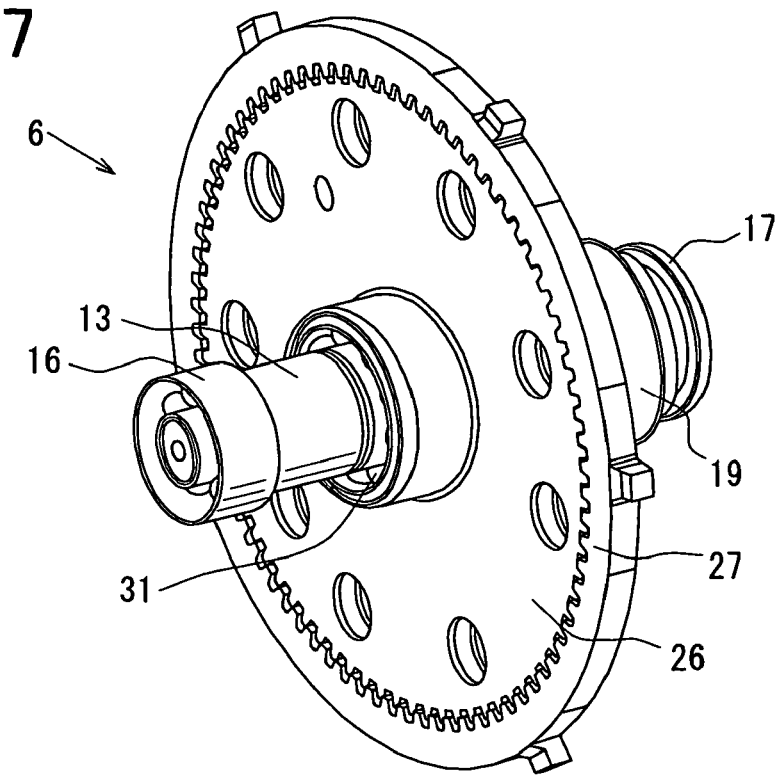
FIG. 7 is a perspective view of a reduction gear as seen from a rear side.
Figure 8:
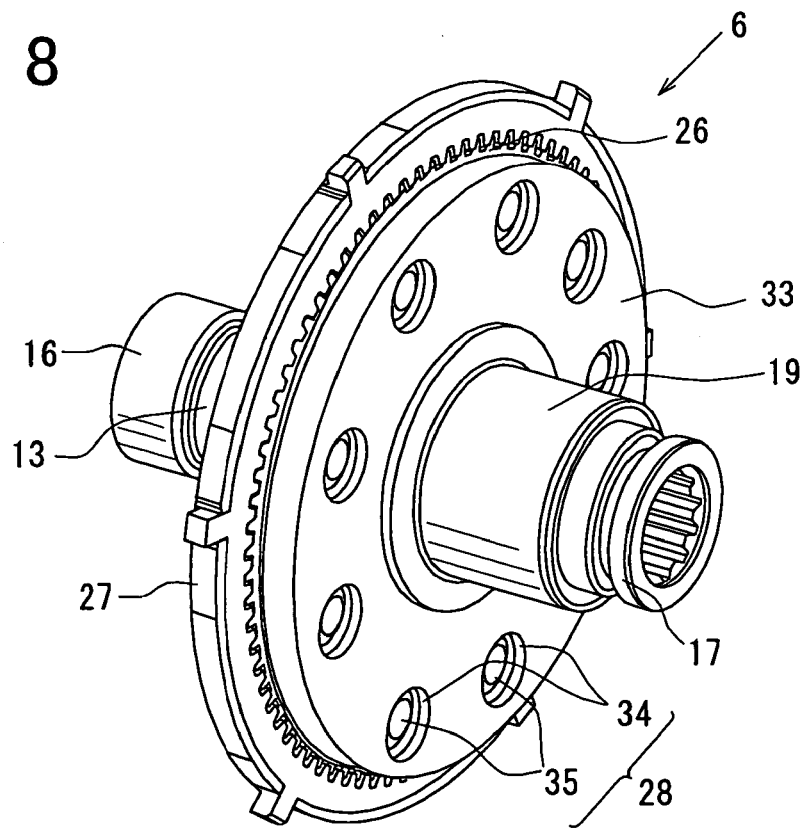
FIG. 8 is a perspective view of the reduction gear as seen from a front side.
Figure 9:
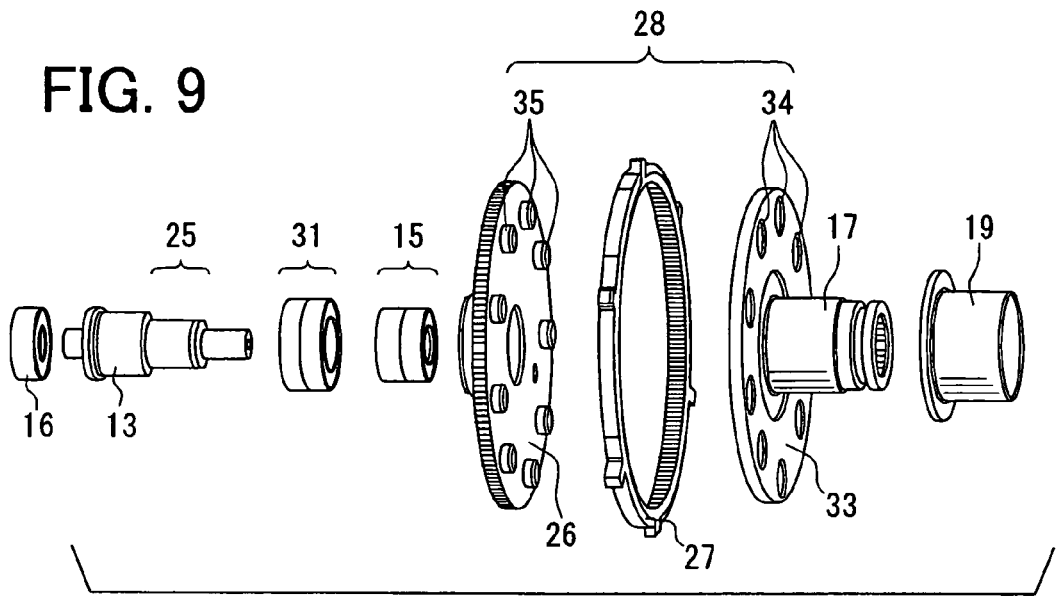
FIG. 9 is an exploded perspective view of the reduction gear as seen from the front side.

The reduction gear 6 will be described below with reference to FIGS. 7 to 9.

The reduction gear 6 used in this first embodiment is an inner gearing type planetary reduction gear (cycloid reduction gear) which is a kind of a planetary reduction gear. The reduction gear 6 includes a sun gear 26 (inner gear; external teeth) which is mounted in an eccentrically rotatable state relative to the rotor shaft 13 through an eccentric portion 25 of the rotor shaft, a ring gear 27 (outer gear; internal teeth) with which the sun gear 26 meshes from the inside, and transfer means 28 for transferring only a rotational (rotation on its own axis) component of the sun gear 26 to the output shaft 17.

The eccentric portion 25 is a shaft adapted to rotate eccentrically relative to the rotational center of the rotor shaft 13 and cause the sun gear 26 to pivot. The eccentric portion 25 supports the sun gear 26 rotatably through a sun gear bearing 31 disposed on the outer periphery of the eccentric portion 25.

As mentioned above, the sun gear 26 is supported rotatably relative to the eccentric portion 25 of the rotor shaft 13 through the sun gear bearing 31 and it is constructed so as to rotate while being pushed against the ring gear 27 with rotation of the eccentric portion 25.

The ring gear 27 is fixed to the front housing 18.

The transfer means 28 is made up of plural inner pin holes 34 formed on the same circumference of a flange 33 which is adapted to rotate together with the output shaft 17 and plural inner pins 35 formed on the sun gear 26 and loosely fitted respectively in the inner pin holes 34.

The plural inner pins 35 are formed projectingly on a front face of the sun gear 26.

The plural inner pin holes 34 are formed in the flange 33 which is provided at a rear end of the output shaft 17. A rotational (rotation on its own axis) motion of the sun gear 26 is transmitted to the output shaft 17 by engagement between the inner pins 35 and the inner pin holes 34.

According to this construction, when the rotor shaft 13 rotates and the sun gear 26 rotates eccentrically, the sun gear 26 decelerates relative to the rotor shaft 13 and this decelerated rotation is transmitted to the output shaft 17. The output shaft 17 is connected to a control rod 45 (to be described later) in the shift range switching mechanism 3.

Unlike this first embodiment there may be adopted a construction wherein plural inner pin holes 34 are formed in the sun gear 26 and plural inner pins 35 are formed on the flange 33.

The shift range switching mechanism 3 will be described below with reference to FIG. 4.

The shift range switching mechanism 3 (including the parking switching mechanism 4) is operated by the output shaft 17 of the reduction gear 6 described above.

In the automatic transmission 2, shift ranges (e.g., "P", R, "N", "D") are switched from one to another by sliding a manual spool valve 42 provided in a hydraulic valve body 41 to an appropriate position, switching an oil pressure supply path to a hydraulic clutch (not shown) in the automatic transmission 2 and controlling the state of engagement of the hydraulic clutch.

On the other hand, switching between locking and unlocking in the parking switching mechanism 4 is performed by engagement or disengagement between a recess 43*a* formed in a parking gear 43 and a projection 44*a* of a parking pole 44. The parking gear 43 is connected to an output shaft of the automatic transmission 2 through a driving shaft and a differential gear (neither shown). By inhibiting rotation of the parking gear 43 the driving wheels of the vehicles are locked and a locked state in parking of the vehicle is attained.

A generally sectorial detent plate 46 is fixed by driving a spring pin (not shown) or the like onto the control rod 45 which is driven by the reduction gear 6.

Plural recesses 46*a* are formed in a radial end (a generally sectorial arcuate portion) of the detent plate 46 and an engaging portion 47*a* is formed at an end of a detent spring 47 which is fixed to the hydraulic valve body 41. The switched shift range is held by engagement of the engaging portion 47*a* into a recess 46*a*.

A pin 48 for actuating the manual spool valve 42 is secured to the detent plate 46.

The pin 48 is engaged in a groove 49 formed in an end portion of the manual spool valve 42. When the detent plate 46 is rotated by the control rod 45, the pin 48 is moved arcuately and the manual spool valve 42 which engages the pin 48 performs a linear motion in the interior of the hydraulic valve body 41.

Figure 4:
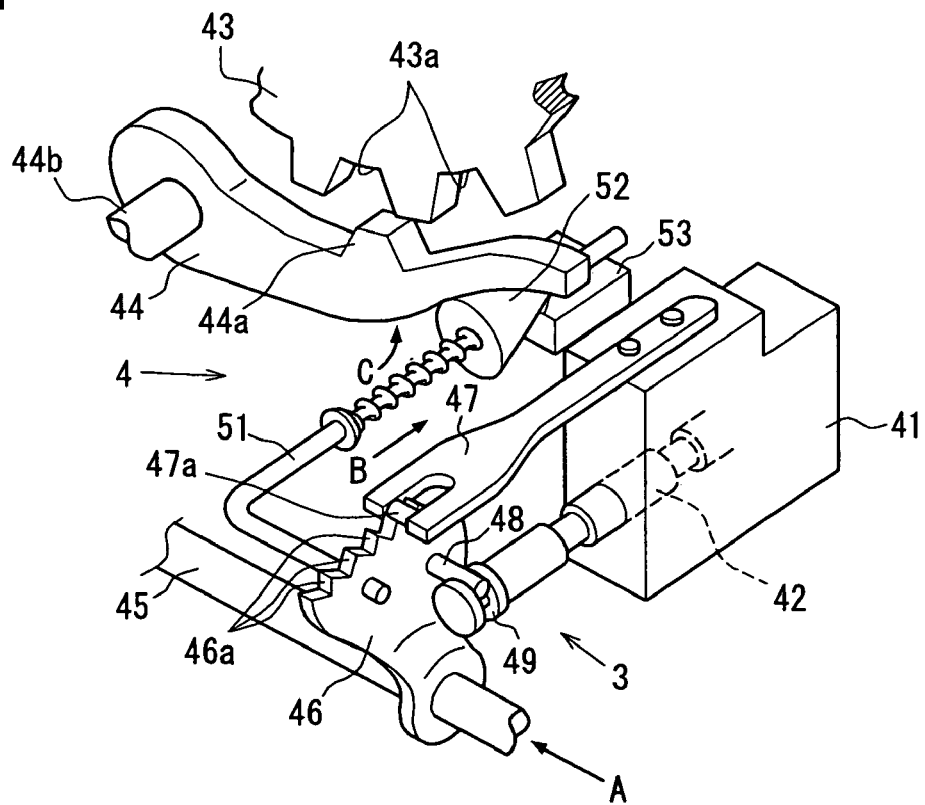
FIG. 4 is a perspective view of a shift range switching mechanism including a parking switching mechanism.

When the control rod 45 is rotated in the clockwise direction as seen in the direction of arrow A in FIG. 4, the pin 48 pushes the manual spool valve 42 into the hydraulic valve body 41 through the detent plate 46, whereby the oil path within the hydraulic valve body 41 is switch in the order of "D"→"N"→"R"→"P". That is, the shift ranges in the automatic transmission 2 are switched in the order of "D"→"N"→"R"→"P".

When the control rod 45 is rotated in the opposite direction, the pin 48 draws out the manual spool valve 42 from the hydraulic valve body 41, whereby the oil path within the hydraulic valve body 41 is switched in the order of "P"→"R"→"N"→"D". That is, the shaft ranges in the automatic transmission 2 are switched in the order of "P"→"R"→"N"→"D".

On the other hand, a parking rod 51 for actuating the parking pole 44 is secured to the detent plate 46 and a conical portion 52 is provided at a free end of the parking rod 51.

The conical portion 52 is interposed between a projecting portion 53 of a housing of the automatic transmission 2 and the parking pole 44. When the control rod 45 is rotated in the clockwise direction as seen in the direction of arrow "A" in FIG. 4 (more particularly, "R"→"P" range), the parking rod 51 displaces itself in the direction of arrow "B" in FIG. 4 through the detent plate 46 and the conical portion 52 pushes up the parking pole 44. Consequently, the parking pole 44 rotates in the direction of arrow "C" in FIG. 4 about a shaft 44*b* and the projection 44*a* of the parking pole 44 engages a recess 43*a* of the parking gear 43 to lock the parking switching mechanism 4.

When the control rod 45 is rotated in the opposite direction (more particularly, "P"→"R" range), the parking rod 51 is pulled back in the direction opposite to the arrow B direction in FIG. 4, so that there no longer is any force for pushing up the parking pole 44. Since the parking pole 44 is urged constantly in the direction opposite to the arrow C direction in FIG. 4 by means a spring (not shown), the projection 44*a* of the parking pole 44 becomes disengaged from the recess 43*a* of the parking gear 43. As a result, the parking gear 43 becomes free and the parking switching mechanism 4 is unlocked.

The encoder 7 will be described below with reference to FIGS. 10 to 14.

The encoder 7 (rotor angle detecting means) for detecting a rotational angle of the rotor 11 is mounted within the housing (front housing 18+rear housing 20) of the rotary actuator 1 described above. A rotational angle of the rotor 11 is detected by the encoder 7 and the supply of an electric current to the coils 22 is controlled switchingly, whereby the electric motor 5 can be operated at high speed without step-out.

The encoder 7, which is an incremental type, includes a magnet 61 adapted to rotate together with the rotor 11 and a magnetism detecting Hall IC 62 (more particularly, Hall ICs 62A and 62B for first and second rotational angles and a Hall IC 62Z for index) disposed within the rear housing 20. The Hall IC 62 is supported by a substrate 63 which is disposed within the rear housing 20.

Figure 11:
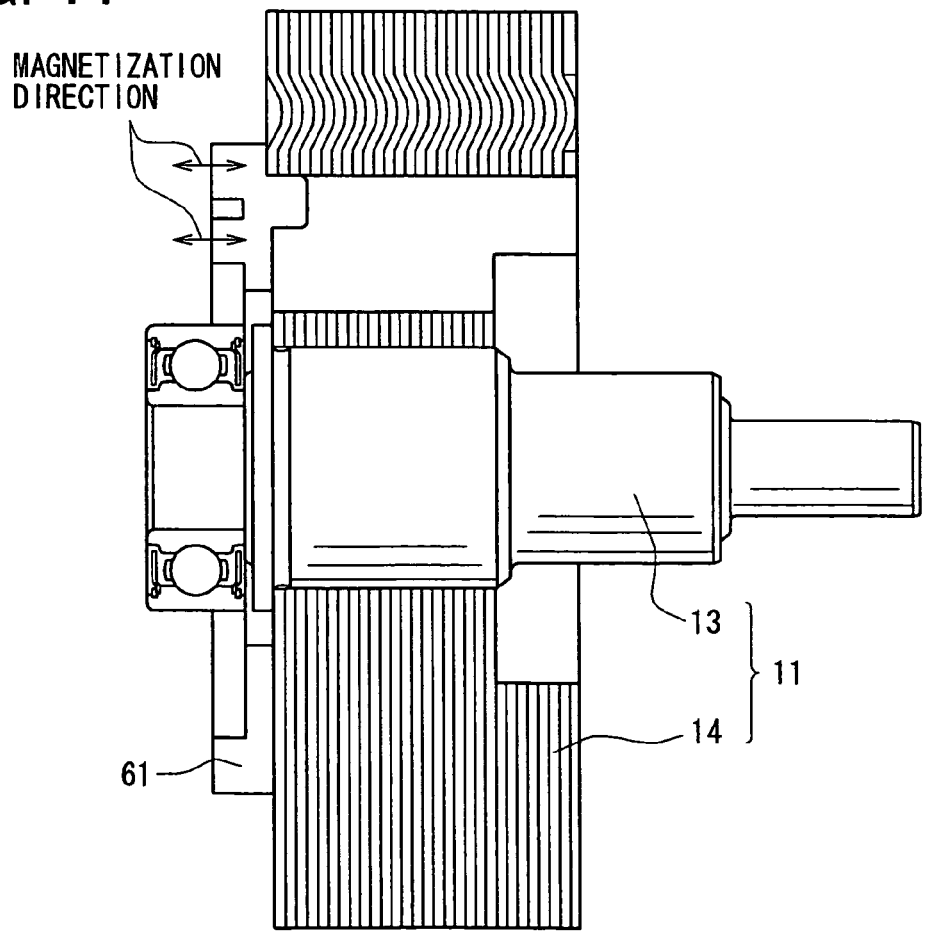
FIG. 11 is a sectional view of a rotor with the magnet mounted thereto.
Figure 10A:
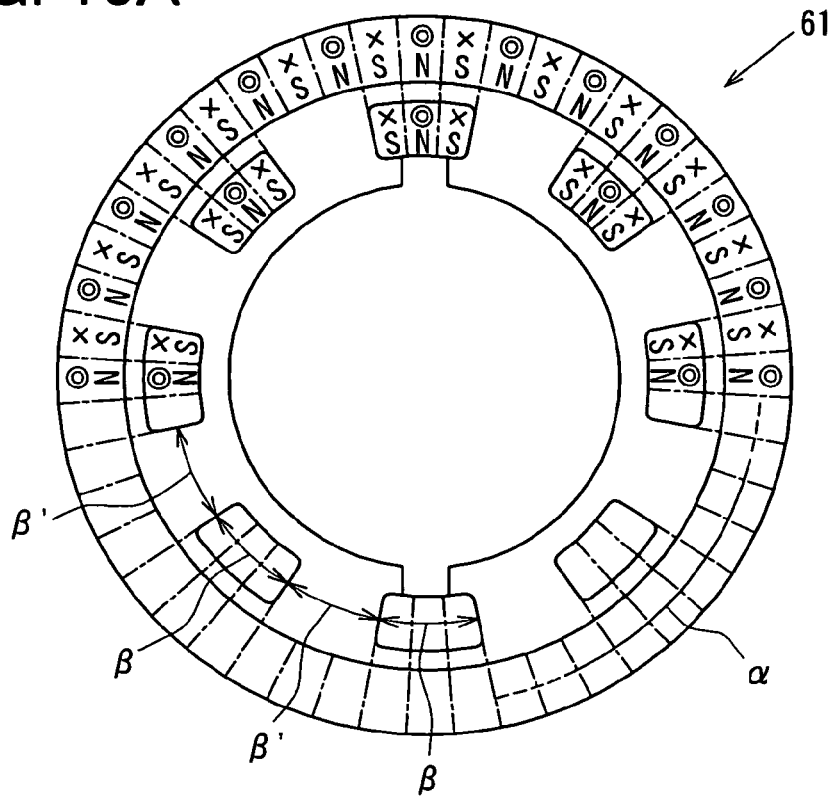
FIGS. 10A and 10B are a plan view and a sectional view, respectively, showing a magnetized state of a magnet.
Figure 10B:
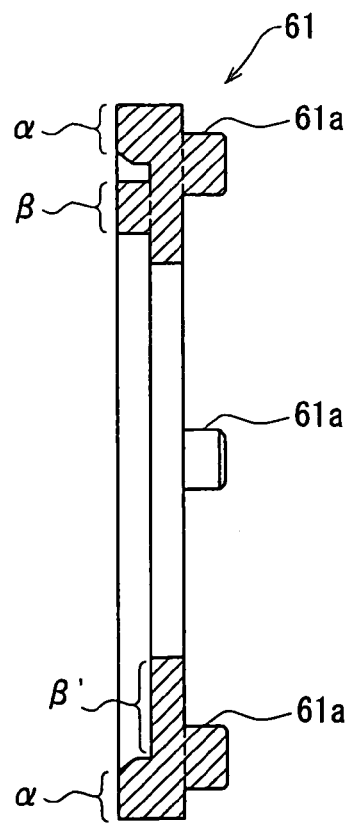
Figure 12:
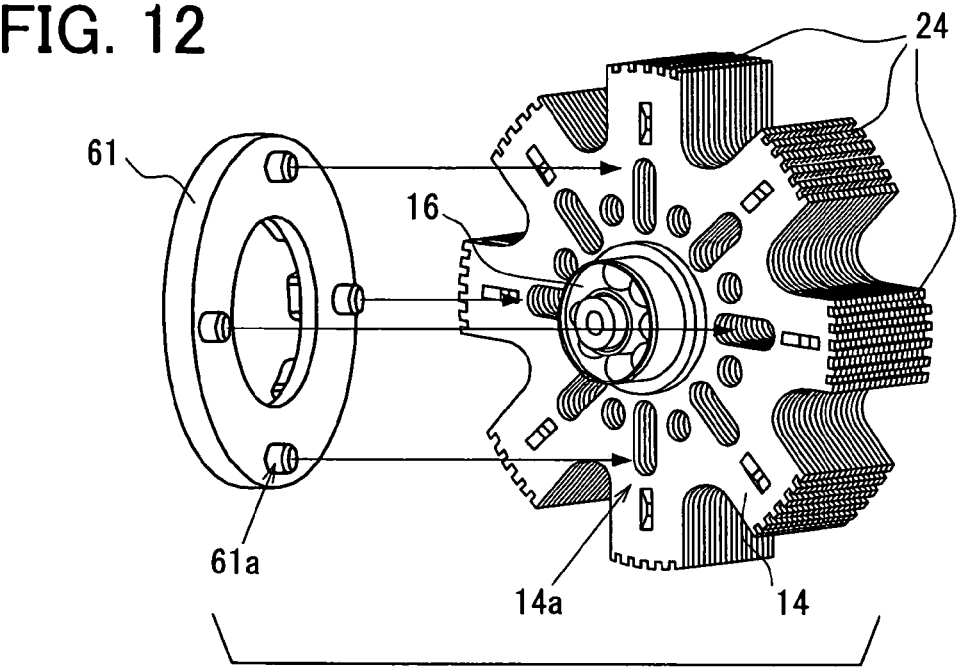
FIG. 12 is an explanatory diagram showing in what manner the magnet is mounted.
Figure 13:
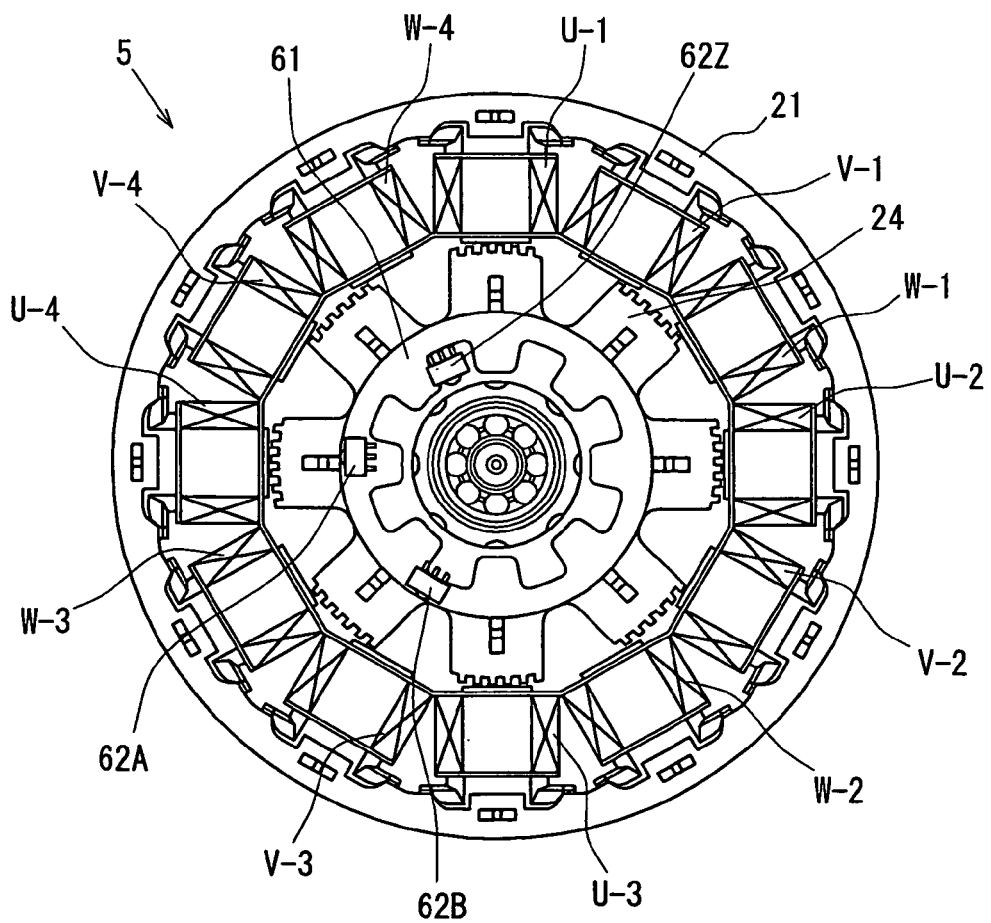
FIG. 13 is a layout diagram of a Hall IC.

As shown in FIGS. 10 to 12, the magnet 61 has a generally ring shape and is disposed coaxially with the rotor shaft 13. The magnet 61 is bonded to an axial end face (rear face) of the rotor core 14.

Plural magnet positioning holes 14a are formed in the rear face of the rotor core 14, as shown in FIG. 12. On the other hand, plural lugs 61a are formed on the bonding face of the magnet 61. By inserting the lugs 61a of the magnet 61 into the holes 14a of the rotor core 14, the magnet 61 is mounted coaxially with the rotor core 14.

As shown in FIG. 11, the face (rear face) of the magnet 61 opposed to the Hall IC 62 is magnetized for the detection of rotational angle and index, whereby a magnetic force is developed axially of the magnetic 61.

Now, with reference to FIG. 10, a description will be given about magnetization of the face (rear face) opposed to the Hall IC. On an outer periphery side of the rear face of the magnet 61, there is provided in the rotational direction a rotational angle-related magnetized portion α which is magnetized to have multiple poles for generation and stop of generation of a rotational angle signal, and in adjacency to an inner periphery of the magnet rear face and in the rotational direction there are provided an index-related magnetized portion β for generation and stop of generation of an index signal and an index-related non-magnetized portion β' not concerned in signal generation.

The rotational angle-related magnetized portion α comprises magnetized multiple poles in the rotational direction for generating a rotational angle signal (hereinafter referred to as A-phase or B-phase signal). In the example of FIG. 10, N and S poles are magnetized repeatedly at 7.5° pitch. More specifically, the rotational angle-related magnetized portion α has forty-eight poles of A- and B-phase sensing portions.

The index-related magnetized portion β is for producing an index signal (hereinafter referred to as Z-phase signal) with a period (45° interval) of making a round of electric power supply in each exciting coil 22 of plural phases (U phases, V phase, W phase). N poles for producing Z-phase signals at 45° intervals are magnetized at 7.5° pitches are magnetized at 7.5° pitches and S poles are magnetized on both sides of each N pole in the rotational direction.

The index-related non-magnetized portion β' is a non-magnetized portion which lies between adjacent index-related magnetized portions β and which does not produce a Z-phase signal.

The Hall ICs 62A and 62B for first and second rotational angles are supported by the substrate 63 in an axially opposed state to the rotational angle-related magnetized portion α. The Hall IC 62Z for index is supported by the substrate 63 in an axially opposed state to the index-related magnetized portion β and non-magnetized portion β'.

The Hall ICs 62A and 62B for first and second rotational angles are supported by the substrate 63 so that their supported positions are 3.75° in terms of a relative angle (90° in terms of an electrical angle). Eventually, A- and B-phase signals become 3.75° in terms of a relative angle (90° in terms of an electrical angle (see FIG. 14).

The Hall ICs 62A and 62B for first and second rotational angles and the Hall IC 62Z for index are each an integral combination of a Hall element and an ON-OFF signal producing IC. The Hall element produces an output proportional to the amount of passing magnetic flux, and when the density of a magnetic flux on N pole side given to the Hall element exceeds a threshold value, rotational angle signals (A-, B-, Z-phase signals) are produced (signal ON), while when the magnetic flux density on S pole side becomes larger than a threshold value, the rotational angle signals (A-, B-, Z-phase signals) are stopped (signal OFF).

Although in this first embodiment Hall ICs (Hall ICs 62A and 62B for first and second angles and Hall IC 62Z for index) each constructed by an integral combination of a Hall element and an ON-OFF signal generating circuit are shown as an example, the Hall element and the ON-OFF signal generating circuit may be disposed separately. More particularly, the ON-OFF generating circuit and the Hall element may be mounted separately on the substrate 63 or in the interior of ECU 9.

Figure 14A:
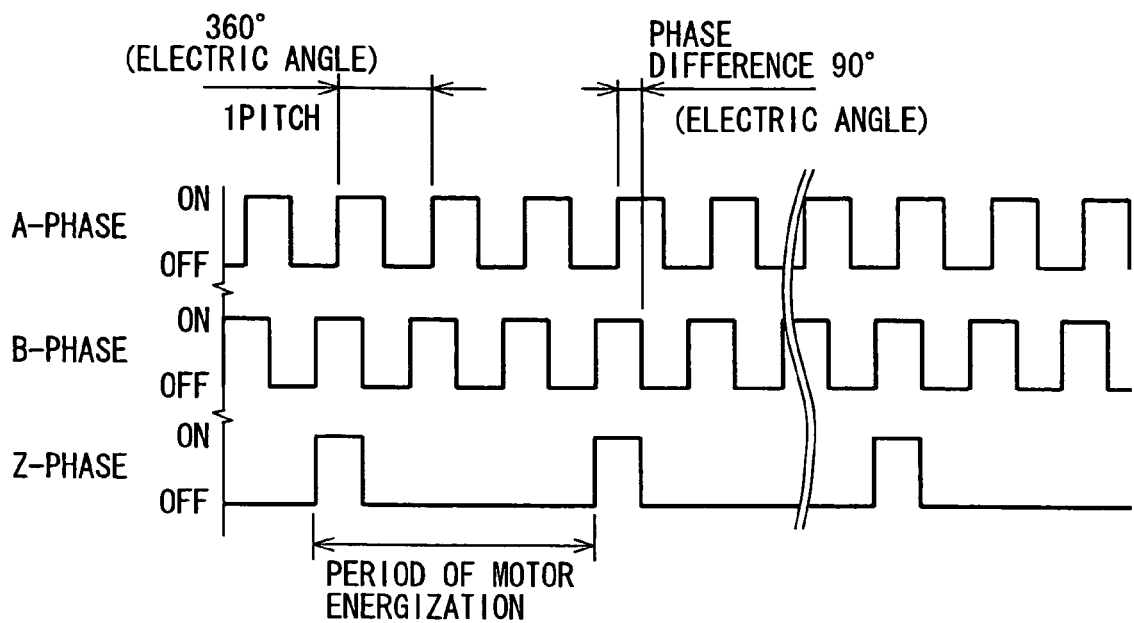
FIG. 14A is an output waveform diagram of A, B, and Z phases in a reverse-rotated state of the rotor
Figure 14B:
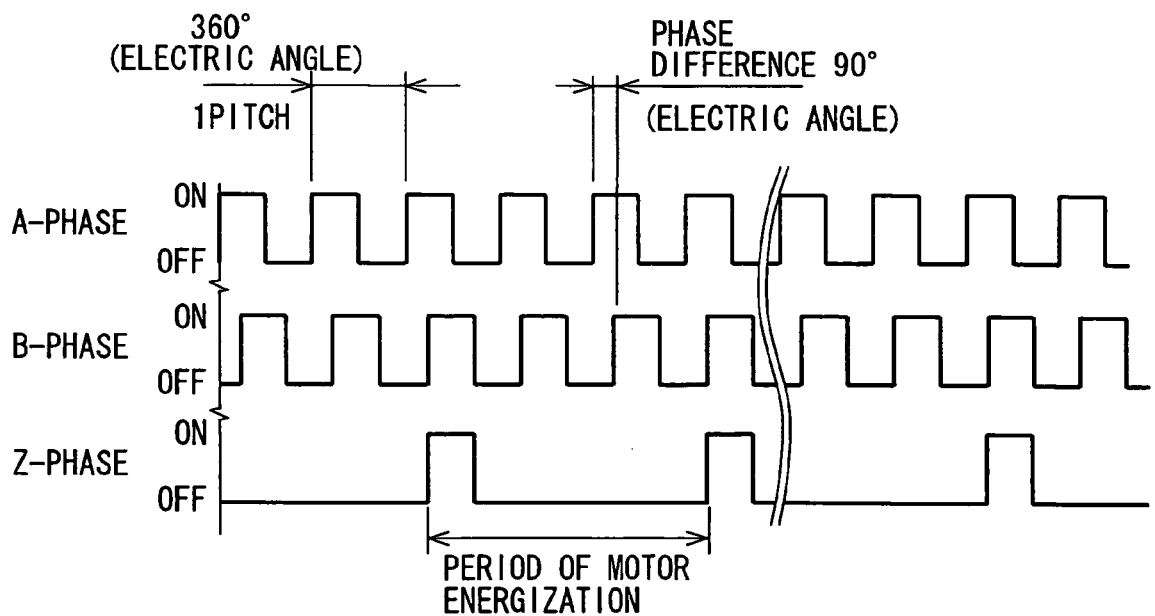
FIG. 14B is an output waveform diagram of A, B, and Z phases in a forward-rotated state of the rotor.
Figure 15:
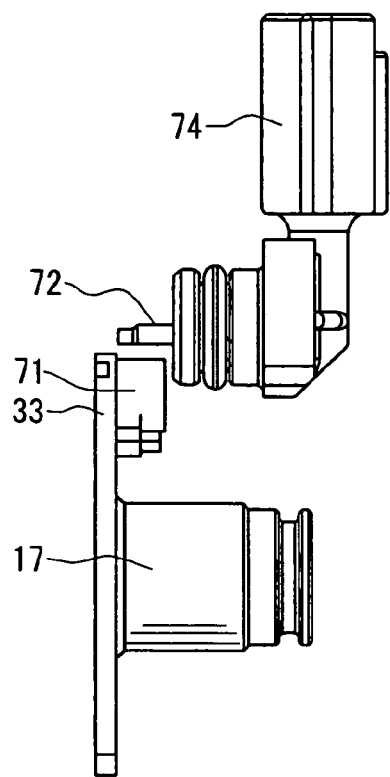
FIG. 15 is a side view showing a mounting position of output angle detecting means.
Figure 16:
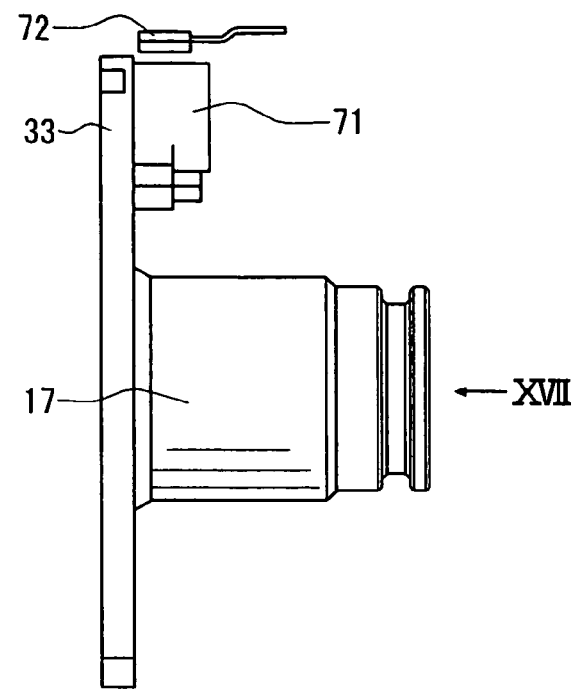
FIG. 16 is a side view showing a linear output Hall IC exclusive of a resin mold of a connector portion shown in FIG. 15.

Next, with reference to FIG. 14, a description will be given about output waveforms of A-, B-, and Z-phase signals outputted by the encoder 7.

The A- and B-phase signals are output signals having a phase difference of 3.75° in terms of a relative angle (90° in terms of an electrical signal). In this first embodiment the A- and B-phase signals are each outputted one period at every 15° rotation of the rotor 11.

The Z-phase signal is an index signal (ON signal in this first embodiment) for switching the energization of the motor which signal is outputted once every 45° rotation of the rotor 11. With this Z-phase signal, it is possible to define a relative positional relation between the energization phase of the electric motor 5 and the A- and B-phases.

The substrate 63 supports the Hall ICs 62A and 62B for first and second rotational angles in an axially opposed state to the rotational angle-related magnetized portion α and supports the Hall IC 62Z for index in an axially opposed state to the index-related magnetized portion β and non-magnetized portion β'. The substrate 63 is attached to a rear side face of each exciting coil 22 and is disposed in the interior of the housing 20.

The output angle detecting means 8 will be described below with reference to FIGS. 15 to 18.

The rotary actuator 1 includes the output angle detecting means 8 for detecting a rotational angle of the output shaft 17. In accordance with the rotational angle of the output shaft 17 detected by the output angle detecting means 8 the ECU detects an actual shift range (e.g., "P", R, "N", or "D") which is actually set by the shift range switching mechanism 3.

The output angle detecting means 8 detects a rotational angle of the output shaft 17 as a continuous quantity and it is made up of a magnet 71 fixed to a front face of the flange 33 which rotates together with the output shaft 17 and a linear output Hall IC 72.

Figure 17:
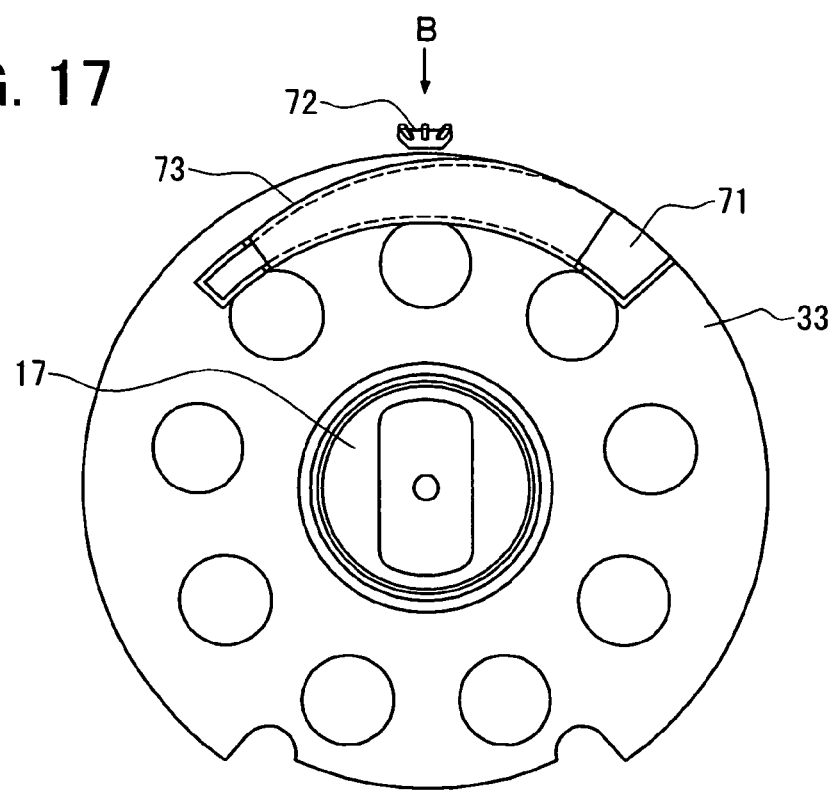
FIG. 17 is a view as seen in the direction of an arrow X in FIG. 16.

As shown in FIG. 17, the magnet 71 has a generally crescent shape when seen in the axial direction and it is molded with resin 73. The magnet 71 is magnetized so as to provide intersection of a magnetic flux in arrow "B" direction in FIG. 17 with respect to the linear output Hall IC 72. The magnet 71 is provided in such a manner that the density of a magnetic flux passing through the linear output Hall IC 72 changes with a change in distance between the magnet 71 and the linear output Hall IC 72 within the rotational range of the output shaft 17 (within a set movement range of the actual range).

More particularly, in this embodiment, the distance between the linear output Hall IC 72 and the magnet 71 becomes the longest (the density of the magnetic flux passing through the linear output Hall IC 72 becomes the lowest) at a rotated position of the output shaft 17 corresponding to "D" side as the actual shift range and becomes the shortest (the density of the magnetic flux passing through the linear output Hall IC 72 becomes the highest) at a rotated position of the output shaft 17 corresponding to "P" side as the actual shift range.

Figure 18:
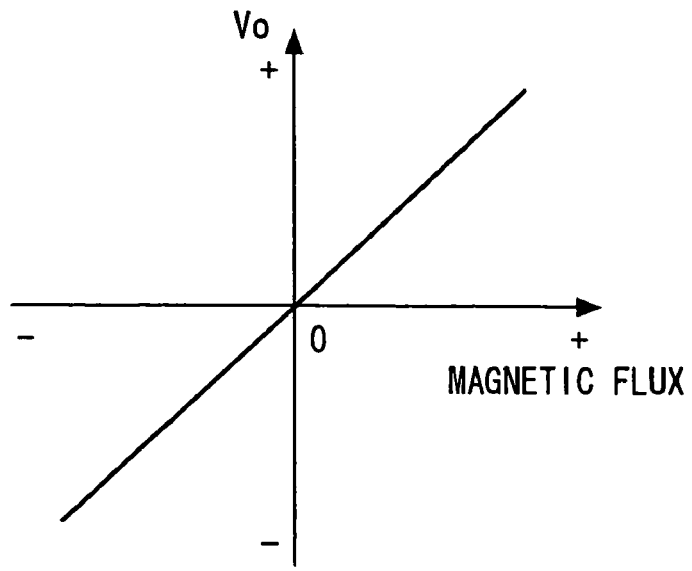
FIG. 18 is a graph showing a relation between the magnitude of a magnetic flux passing through the linear output IC and an output voltage.

The linear output Hall IC 72 is mounted with use of a connector 74 made of resin and includes a Hall element which produces an output voltage proportional to the density of the magnetic flux passing through the linear output Hall IC 72. As shown in FIG. 18, the higher the density of the magnetic flux passing through the linear output Hall IC 72, the larger the output voltage produced by the Hall element.

That is, by reading an output voltage of the linear output Hall IC 72, it is possible to detect from the read output voltage a rotational angle of the output shaft 17 and an actual shift range.

Now, with reference to FIG. 3, a description will be given below about ECU 9.

The ECU 9 for controlling the supply of an electric current to the electric motor 5 is a microcomputer of a known structure including a CPU for performing control and arithmetic processings, memory means (e.g., ROM, EEPROM, SRAM, or RAM) 81 for the storage of various programs and data, input circuit, output circuit, and power supply circuit.

EEPROM is a memory capable of storing data even in a completely power OFF condition and SRAM is a memory capable of holding stored data under the supply of a slight electric current (SRAM is semiconductor memory means using a large number of flip-flops and is easy to handle because such a refresh operation as that required of DRAM for holding stored data is not necessary).

In FIG. 3, the reference numeral 82 denotes a starting switch (e.g., the vehicular ignition switch or accessory switch), numeral 83 denotes an onboard battery, numeral 84 denotes display/warning means (e.g., visual display in normal drive, warning lamp, or warning voice) for indicating a shift range and the state of the rotary actuator 1, numeral 85 denotes a coil drive circuit for the electric motor 5, numeral 86 denotes a vehicle speed sensor, and numeral 87 denotes a setting switch (or a sensor) for shift range setting means which is operated by a vehicular occupant, a brake switch (brake detecting means) for detecting whether a vehicular brake system for imparting a braking force to each wheel is in operation or not, or other sensors for detecting vehicle conditions.

When the starting switch 82 is turned ON, the supply of an electric current by the onboard battery 83 is started and the ECU 9 performs various arithmetic controls, while when the starting switch 82 is turned OFF, the ECU 9 performs a processing for turning OFF the power supply and thereafter the supply of an electric current by the battery 83 is stopped. That is, the supply of an electric current is started upon turning ON of the starting switch 82 and is stopped upon turning OFF of the starting switch.

Next, the coil drive circuit 85 will be described below with reference to FIG. 6.

As described above, the electric motor 5 comprises star-connected coils U, V, and W.

The coil drive circuit 85 includes switching elements 88 to supply electric power for each phase (for each of coils U, V, W). When the ECU 9 switches ON or OFF the switching elements 88, the state of energization of each of the coils U, V, W is switched ON or OFF.

Figure 19A:
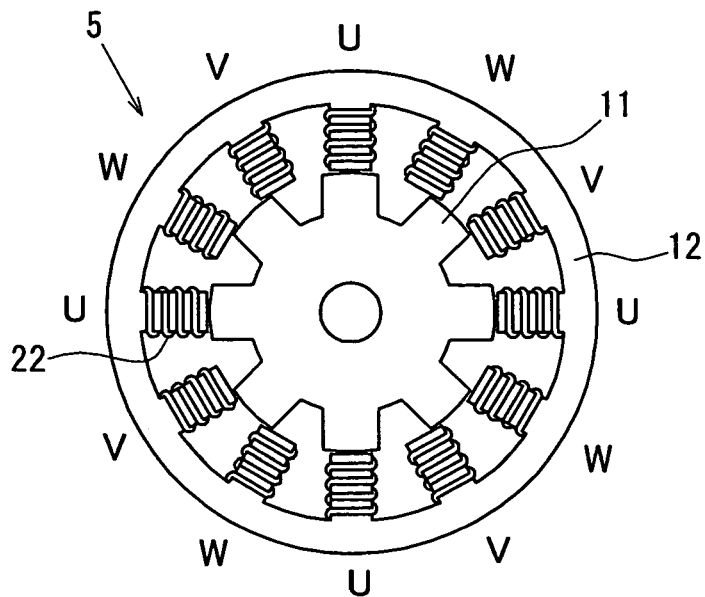
FIG. 19A is a sectional view of exciting coils and FIG. 19B is a diagram showing an energizing condition at each phase of the exciting coils in normal control.
Figure 19B:
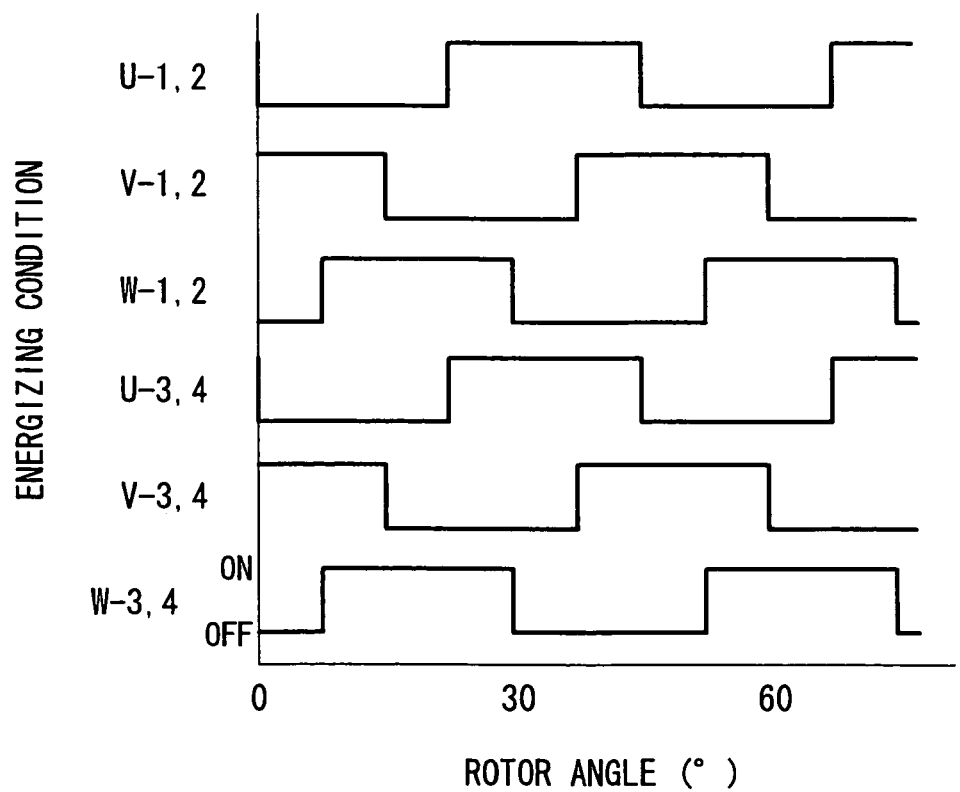

For rotating the rotor 11, as shown in FIG. 19, the ECU 9 turns ON or OFF the switching elements 88 on the basis of a rotational angle of the rotor 11 detected by the encoder 7 and an excitation delay correction term (as the case may be, by open control), thereby switching in order the state of energization of each excitation coil 22.

In the ECU 9 are installed various control programs, including "rotor angle read means" for grasping a rotational direction, rotational speed, rotational quantity, and rotational angle of the rotor 11 from the output of the encoder 7 (outputs of the Hall ICs 62A and 62B for first and second rotational angles and Hall IC 62Z for index), "output angle read means (same as the actual shift range read means)" for reading a rotational angle (same as the actual shift range) of the output shaft 17 from the output of the output angle detecting means 8 (output of the linear output Hall IC 72), and "normal control means" which controls the electric motor 5 in such a manner that a shift range switching command set by the shift range setting means and the actual shift range which the ECU 9 recognizes become coincident with each other.

When there is a difference between the "shift range switching command" set by the shift range setting means and the "actual shift range (the actual shift range which the ECU 9 recognizes)" detected by the output angle detecting means 8, the normal control means, which is a control program, determines a rotational direction, rotational speed, rotational quantity, and rotational angle of the electric motor 5, then on the basis of the determination, controls the supply of an electric current to the exciting coils of plural phases to control the rotational direction, rotational speed, rotational quantity, and rotational angle of the electric motor 5, thereby making the shift range switching command set by the shift range setting means and the actual shift range which the ECU 9 recognizes coincident with each other.

As described above, when there is a difference between the "shift range switching command" set by the shift range setting means and the "actual shift range" detected by the output angle detecting means 8, the ECU 9 controls the rotation of the electric motor 5 so as to make mutual coincidence between the "shift range switching command" set by the shift range setting means and the "recognized shift range" which the ECU 9 recognizes.

Consequently, when the "recognized shift range" which the ECU 9 recognizes and the "actual shift range" which the shift range switching mechanism 3 sets actually are different by some unexpected cause (e.g., dismounting of the rotary actuator 1 in maintenance), it is likely that the actual shift range may be a vehicle starting shift range and there may occur such an inconvenience as starting of the vehicle at the time of start-up of the engine even when the shift range switching command and the recognized shift range are coincident with each other and "vehicle non-start shift range (e.g., a start permission shift range such as "P" or "N" range) is shown.

In more particular terms, even when the "shift range switching command" is "P" or "N" range and the "recognized shift range" recognized by the ECU 9 is "P" or "N" range, it is likely that the vehicle may start at the time of start-up of the engine (starter ON) when the "actual shift range" of the shift range switching mechanism is "D" or "R" range.

According to a more concrete example, consideration is given to the case where an actual shift range (the last-time shift range) in a standstill state of the vehicle is stored in EEPROM or SRAM and then the starting switch 82 is turned ON. In this case, when a program which regards the "last-time shift range" stored in the last-time standstill of the vehicle as the present "actual shift range" is installed in ECU 9 and when the rotary actuator 1 is once dismounted in maintenance for example and the output shaft 17 rotates during the dismounting, it is likely the "last-time shift range" stored in memory and the "actual shift range" after the maintenance and mounting may be different from each other. Thus, even when the "last-time shift range" stored in EEPROM or SRAM is "N" or "P" range, it is likely that the present "actual shift range" may be another shift range (e.g., "R" or "D" range). Therefore, it is necessary to prevent starting of the vehicle at the time of start-up of the engine.

The following means is adopted in this first embodiment in order to prevent the occurrence of such an inconvenience as unintended starting of the vehicle (an example of occurrence of an unexpected drive) at the time of start-up of the engine (an example of an object apparatus).

(1) As shown in FIG. 3, the ECU 9 is provided so as to control the operation of a starter relay 89. The starter relay 89 is of a known structure comprising a starter switch for connection and disconnection between a motor of a starter (not shown) as an engine starting device and the onboard battery 83 and a starter coil for turning ON and OFF the starter switch by the supply and stop of supply of an electric current. The ECU 9 is provided so that it can control the energization of the starter coil.

(2) The rotary actuator 1 includes the output angle detecting means 8 for detecting a rotational angle of the output shaft 17 and is provided so that an "actual shift range" in the shift range switching mechanism 3 can be detected by the ECU 9 on the basis of the rotational angle of the output shaft 17.

(3) The ECU 9 includes the memory means 81 having EEPROM which can hold stored data even when the supply of an electric current is stopped or SRAM which can hold stored data by the supply of a slight electric current.

The ECU 9 has a function of causing a rotational angle detected by the output angle detecting means 8 to be stored in EEPROM or SRAM as the last-time angle (corresponding to the last-time shift range and position) when the starting switch 82 is OFF.

Figure 20:
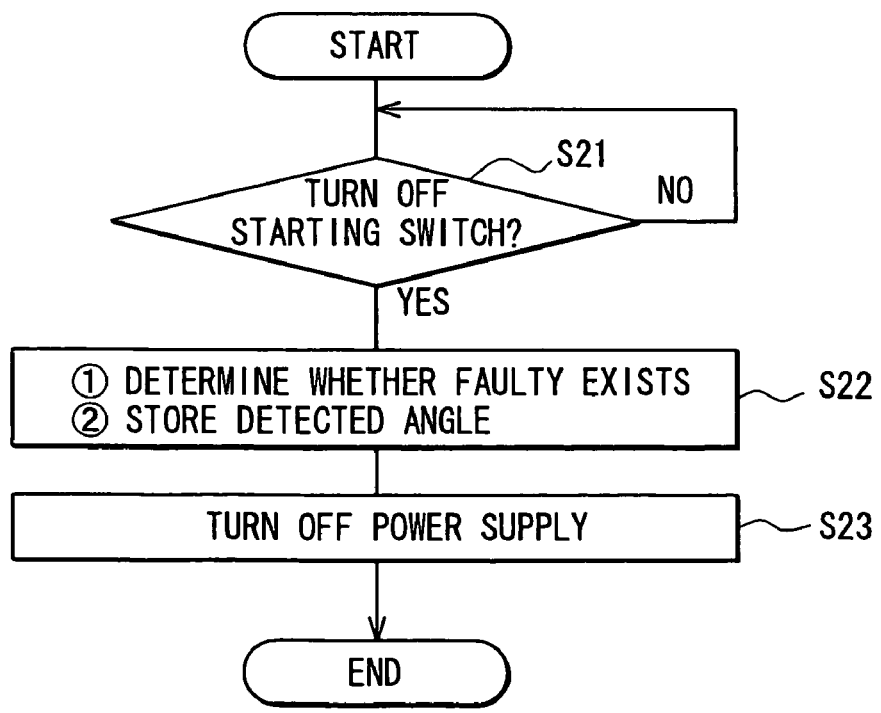
FIG. 20 is a flow chart of a last-time angle storage control.

This last-time angle storing control will be described below with reference to the flow chart of FIG. 20.

In this control routine, it is determined whether the starting switch 82 has been turned OFF or not (Step S21). When the answer in Step S21 is negative, the processing flow returns to Step S21.

When the answer in Step S21 is affirmative (the starting switch 82 is OFF), it is determined whether the output angle detecting means 8 is at fault or not and the result is stored in EEPROM or SRAM, further, the rotational angle detected by the output angle detecting means 8 is stored as the "last-time angle" in EEPROM or SRAM (Step S22). Thereafter, the power supply of the ECU 9 is turned OFF (Step S23) and this storage control is ended (END).

(4) The ECU 9 has a function of "drive inhibiting means." According to this function, the operation of the starter relay 89 is inhibited to inhibit the starting of the engine when the starting switch 82 is ON and when the difference between the "last-time angle" stored in EEPROM or SRAM and the "actual angle→this-time angle (corresponding to this-time shift range and position) which the output angle detecting means 8 detects at that time does not satisfy a predetermined condition (in this embodiment the condition that the difference between this-time angle and last-time angle should be within a certain value).

(5) The ECU 9 has a function of "fault detecting means" for detecting whether the output angle detecting means 8 is at fault or not. The fault detecting means determines that the output angle detecting means 8 is at fault for example when the output voltage of the linear output Hall IC 72 in the output angle detecting means 8 is not within a predetermined range, or when the output of the linear output Hall IC 72 does not change with power control for the electric motor 5 upon operation of the same motor, or when the output of the linear output Hall IC 72 changes beyond a predetermined range despite the electric motor 5 being not in operation. When it is determined that the output angle detecting means 8 is at fault, a Fault Flag indicative of fault of the output angle detecting means 8 is turned ON to store the fault of the output angle detecting means 8 in EEPROM or SRAM in the memory means 81.

(6) According to the drive inhibiting means used in this first embodiment, the operation of the starter relay 89 is inhibited to inhibit starting of the engine when the starting switch 82 is ON and in the case where fault of the output angle detecting means 8 is detected (when Fault Flag of the output angle detecting means 8 is ON in EEPROM or SRAM), in addition to the case where the difference between "this-time angle" and "last-time angle" does not satisfy the predetermined condition.

(7) The ECU 9 has a safety function of inhibiting the operation of the starter relay 89 to inhibit starting of the engine when the starting switch 82 is ON and when the shift range switching command issued by the shift range setting means is different from "P" or "N" range (an example of a vehicle non-start shift range).

(8) As described earlier, the vehicle is provided with the display/warning means 84 which provides visual or auditory information (e.g., a shift range) on ECU 9 to the vehicle occupant.

On the other hand, the ECU 9 has a function of making the occupant provide an indication "to the effect that the start of engine operation is inhibited" on the display/warning means 84.

(9) The ECU 9 has a function of making the display/warning means 84 inform the occupant of "a start inhibition canceling method" when the drive inhibiting means inhibits starting of the engine. An example of the "start inhibition canceling method" may be the following indication: "Please switch the shift range to "P" or "N" range."

On the other hand, the ECU 9 is provided with drive inhibition canceling means for canceling the inhibition of engine drive. When it is detected that the shift range switching command given by the shift range setting means has been set to "P" or "N" range in a state in which the drive inhibiting means inhibits the start of engine drive, the drive inhibition canceling means sets the actual shift range in the shift range switching mechanism 3 to "P" or "N" range. Further, when it is detected that the actual shift range in the shift range switching mechanism 3 has been set to "P" or "N" range, it follows that the shift range switching command ("recognized shift range" which the ECU 9 recognizes) and the "actual shift range" in the shift range switching mechanism 3 become coincident with each other in "P" or "N" range. Therefore, the inhibition of engine start by the drive inhibition means is canceled.

Thus, even when the shift range switching command is set to a range other than "P" or "N" range so that the drive inhibiting means inhibits the start of engine, it is notified that the shift range switching command is changed to "P" or "N" range by the occupant, and when it is detected that the actual shift range has actually been switched to "P" or "N" range, the inhibition of engine start is canceled.

In the above control (9), the shift range switching command is switched to "P" or "N" range by the occupant to thereby cancel the inhibition of engine start. On the other hand, instead of or in combination with the above control (9) there may be adopted the following control (10) to cancel the inhibition of engine start.

(10) As noted previously, the vehicle is provided with a brake switch (e.g., a switch adapted to turn ON upon depression of a foot brake) which detects whether the vehicular braking system for braking wheels is ON or not.

The ECU 9 has a function of notifying the occupant of "a start inhibition canceling method" through the display/warning means 84 when the drive inhibition means inhibits starting of the engine and when it is detected that the vehicular braking system is OFF. A concrete example of the "start inhibition canceling method" may be the following indication: "Please apply the vehicular braking system because of switching to "P" range."

On the other hand, the ECU 9 has a function of drive inhibition canceling means. According to this function, when the brake switch is turned ON (when it is detected that the vehicular braking system has been applied) in a state in which the drive inhibiting means inhibits starting of the engine, the operation of the electric motor 5 is controlled to switch the actual shift range in the shift range switching mechanism 3 to "P" or "N" range. Thereafter, when it is detected that the actual shift range has been switched to "P" or "N" range, the inhibition of engine start by the drive inhibiting means is canceled.

By adopting this control, even in a state in which the drive inhibiting means inhibits starting of the engine because the shift range switching command is set to a range other than "P" and "N" ranges, the actual shift range is set to "P" or "N" range automatically upon application of the vehicular braking system by the occupant. Further, the "recognized shift range" which the ECU 9 recognizes and the "actual shift range" in the shift range switching mechanism 3 become coincident with each other in "P" or "N" range. Consequently, the engine start inhibition by the drive inhibiting means can be canceled.

Figure 1:
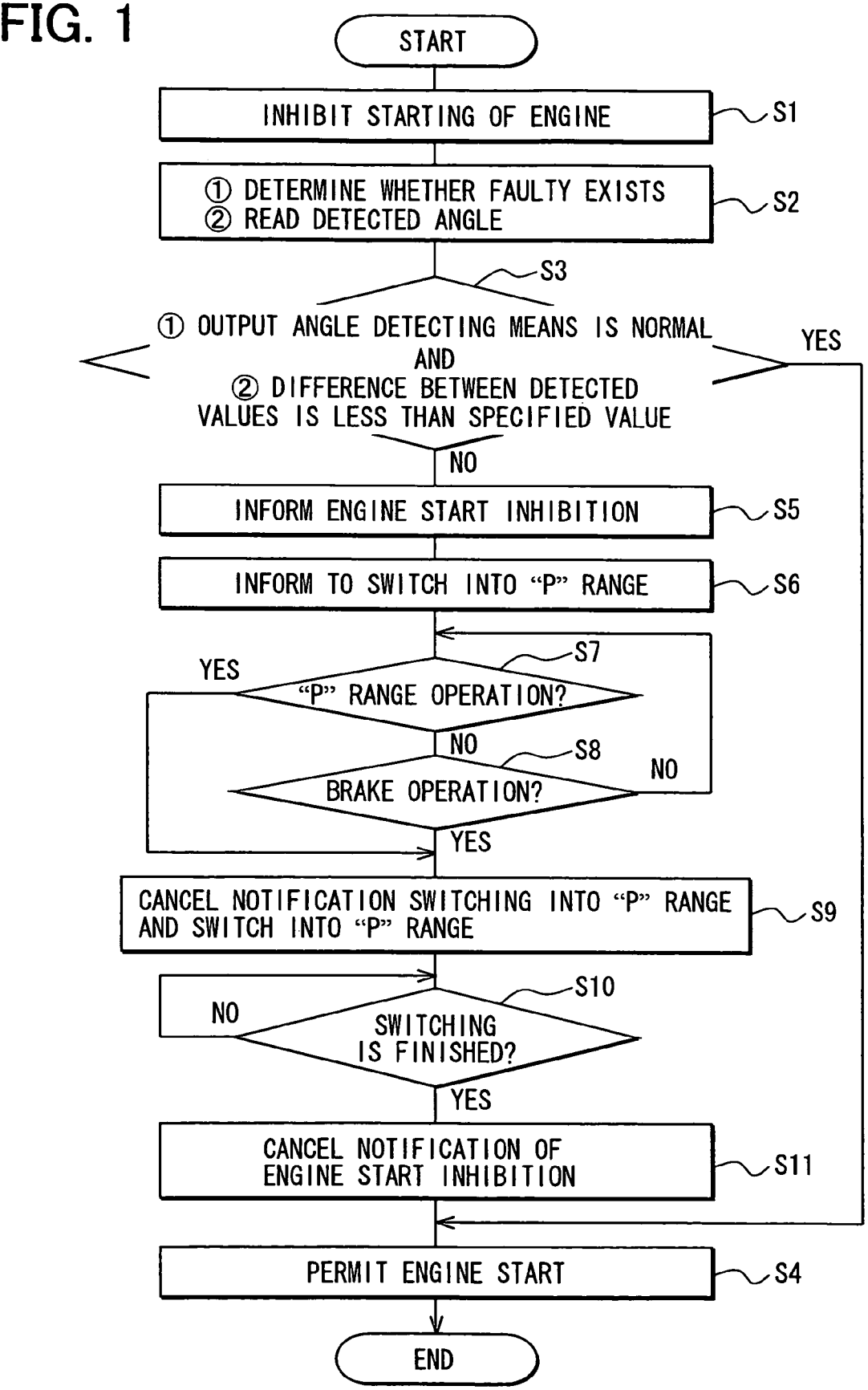
FIG. 1 is a flow chart showing an example of control for inhibiting the start of an engine.

An example of the above controls (1) to (10) will be described below with reference to the flow chart of FIG. 1.

It is assumed that the vehicle non-start shift range in this control example is "P" range.

When the starting switch 82 is turned ON (START), first the operation of the starter relay 89 is inhibited to inhibit starting of the engine (Step S1).

Next, (1) whether Fault Flag of the output angle detecting means 8 is ON or OFF is read from EEPROM or SRAM and (2) "this-time angle" which is detected by the output angle detecting means 8 upon turning ON of the starting switch 82 is read and so is the "last-time angle" from EEPROM or SRAM (Step S2).

Then, it is determined (1) whether the output angle detecting means 8 is normal (Fault Flag is OFF) and (2) whether the difference between "this-time angle" and "last-time angle" is within a certain value or not (Step S3).

When the answer in Step S3 is affirmative (normal), the operation inhibition of the starter relay 89 is canceled into a state permitting engine start (Step S4), thereafter, this control routine is ended (END).

When the answer in Step S3 is negative (abnormal), a cancellation processing for canceling the start inhibition is performed.

In the start inhibition cancellation processing adopted in this first embodiment, first the display/warning means 84 is operated to inform the occupant of "a state of engine start inhibition (an example to the effect of the drive inhibiting means being in operation)" (Step S5).

Next, the display/warning means 84 is operated to notify the occupant of the following: "For starting the engine it is necessary to once switch the shift range to "P" range. Switch the shift lever to "P" range or actuate the brake (a notification example of a start inhibition canceling method)." (Step S6)

Then, it is determined whether the shift range switching command has been set to "P" range or not (Step S7).

When the answer in Step S7 is negative (the shift range switching command is not "P" range), it is determined whether the vehicular braking system is ON or not (Step S8). When the answer in Step S8 is negative (the shift range switching command is not "P" range and the vehicular braking system is OFF), the processings of Steps S7 and S8 are repeated until the shift range switching command is set to "P" range or until the vehicular braking system is actuated.

When the answer in Step S7 or S8 is affirmative, the notification of "Switch the shift range switching command to "P" range" issued by the display/warning means 84 is canceled and the output shaft 17 is rotated while controlling the rotation of the electric motor 5 to switch the actual shaft range in the shift range switching mechanism 3 to "P" range (Step S9).

Next, it is determined whether the actual shift range in the shift range switching mechanism 3 has been switched to "P" range or not (Step S10). When the answer in Step S10 is negative (switching to "P" range has not been completed yet), the processing of Step S10 is repeated until completion of the switching to "P" range.

When the answer in Step S10 is affirmative (switching to "P" range has been completed), the notification of the "state of engine start inhibition" issued by the display/warning means 84 is canceled (Step S11), then the processing flow advances to Step S4 to cancel the inhibition of operation of the starter relay 89, and thereafter this control routine is ended (END).

In this first embodiment, the following effects are obtained by adopting the above construction.

When the starting switch 82 is turned ON and when the difference between "this-time angle" detected by the output angle detecting means 8 and "the last-time angle" stored in EEPROM or SRAM exceeds a certain value, the operation of the starter relay 89 is inhibited by the drive inhibiting means and a state results in which the engine cannot be started.

That is, even in a vehicle wherein the shift range setting means and the shift range switching mechanism 3 are not mechanically connected with each other, the start of the engine is inhibited when the condition that the "recognized shift range" which the ECU 9 recognizes and the "actual shift range" set actually by the shift range switching mechanism 3 should be coincident with each other is not satisfied.

Consequently, upon turning ON of the starting switch 82, it is possible to prevent the occurrence of an unexpected drive (starting of the vehicle caused by starting of the engine in a state in which the recognized shift range and the actual shift range are not coincident with each other).

Since the "last-time value" detected by the output angle detecting means 8 and "Fault Flag" of the output angle detecting means 8 are stored in EEPROM or SRAM, the supply of an electric current to the memory means 81 in addition to ECU 9 can be stopped or the consumption of and electric current can be kept to a very low level during stop of the engine, whereby the power consumption can be suppressed while the engine is OFF.

When Fault Flag of the output angle detecting means 8 is ON in EEPROM or SRAM upon turning ON of the starting switch 82, the starting of the engine is inhibited. That is, not only the actual shift range in the shift range switching mechanism 3 is monitored by the output angle detecting means 8, but also it is monitored whether the output angle detecting means 8 is at fault or not in order to ensure the reliability of the detection result obtained by the output angle detecting means 8. Thus, since the reliability of the detection result obtained by the output angle detecting means 8 can be ensured, it is possible to enhance the reliability of the shift range switching system.

When the starting switch 82 is turned ON and when the shift range switching command given by the shift range setting means is different from "P" and "N" ranges, the start of engine operation is inhibited by the drive inhibiting means, so that it is possible to prevent operation of the starter and starting of the vehicle in a state in which the shift range switching command is "D" or "R" range.

When the drive inhibiting means inhibits the start of engine operation, an indication to the effect that the start of engine operation is inhibited is displayed to the occupant by the display/warning means 84. As a result, the occupant can become aware that the engine cannot be started despite engine start being instructed, and it becomes possible for the occupant to take a countermeasure.

When the drive inhibiting means inhibits engine operation, an indication to the effect that the shift range switching command should be set to "P" or "N" range is provided to the occupant by the display/warning means 84, and the shift range switching command is set to "P" or "N" range. Then, when it is detected that the shift range has actually been switched to "P" range, the inhibition of engine start by the drive inhibiting means is canceled.

In this way the occupant can become aware that the engine cannot be started, and can take a countermeasure (setting the shift range switching command to "P" or "N" range and switching the actual shift range to "P" range). Thus, it becomes possible to cancel the inhibition of engine start and effect starting of the engine.

At the time of inhibiting the start of engine operation by the drive inhibiting means, when an indication to the effect that the vehicular braking system should be actuated is given to the occupant by the display/warning means 84 and when it is detected that the vehicular braking system has been actuated, the electric motor 5 is controlled to switch the actual shift range in the shift range switching mechanism 3 to "P" or "N" range. Thereafter, when it is detected that the actual shift range has been switched to "P" or "N" range, the inhibition of engine start by the drive inhibiting means is canceled.

As a result, even when the shift range switching command is set to "R" or "D" range and engine start is inhibited, the actual shift range in the shift range switching mechanism 3 is switched to "P" or "N" range automatically by actuating the vehicular braking system on the occupant side, whereby it becomes possible to cancel the inhibition of engine start and effect starting of the engine.

[Modification]

In the above embodiment, when engine start is inhibited by the drive inhibiting means, the driver is made to have an understanding that an abnormal condition is occurring, then the abnormal condition is corrected by the will of the driver (setting "P" or "N" range and turning ON the brake) and the inhibition of engine start is canceled. As a result, it becomes possible to avoid the occurrence of an accident.

In the case where the occurrence of an accident is inconceivable, then when engine start is inhibited by the drive inhibiting means, the actual shift range in the shift range switching mechanism 3 may be switched to "P" or "N" range automatically and the inhibition of engine start may be canceled. More particularly, in the flow chart of FIG. 1, there may be adopted a method wherein when the answer in Step S3 is negative, the processing flow advances directly to Step S9 to make the "recognized shift range" which the ECU 9 recognizes and the "actual shift range" set actually in the shift range switching mechanism 3 coincident with each other and thereafter the inhibition of engine start is canceled.

Although the encoder 7 is used in the above embodiment, the encoder 7 may be omitted and the rotational direction, rotational speed, rotational quantity, and rotational angle of the rotor 11 may be controlled by counting the number of times of energization of the exciting coils 22.

Although an SR motor is used as an example of the electric motor 5 in the above embodiment, there may be used another motor such as a reluctance motor, e.g., a synchronous reluctance motor, or a permanent magnet type synchronous motor, e.g., a surface mounted permanent magnet motor (SPM) or an internal permanent magnet motor (IPM).

Although an internal mesh planetary reduction gear (cycloid reduction gear) is used as an example of the reduction gear 6 in the above embodiment, there may be used a planetary reduction gear comprising a sun gear 26 driven by the rotor shaft 13, plural planetary pinions arranged at equal intervals around the sun gear 26, and a ring gear meshing with outer peripheries of the planetary pinions.

Although an internal mesh planetary reduction gear (cycloid reduction gear) is used as an example of the reduction gear 6 in the above embodiment, there may be used a reduction gear comprising a sun gear 26 driven by the rotor shaft 13 and a combination of plural gear trains meshing with the sun gear 26.

Although the combination of the electric motor 5 and the reduction gear 6 is shown in the above embodiment, the drive object may be driven directly with the output of the electric motor 5.

Although in the above embodiment the motor-driven actuator (the rotary actuator 1 in the embodiment) is controlled on the basis of setting made by the operating means (the shift range setting means in the embodiment) to control the operation of the drive object (the shift switching mechanism 3 in the embodiment). However, the present invention may be applied to an apparatus in which the operation of the motor-driven actuator is controlled in accordance with a command signal issued by control means (ECU 9 in the embodiment) to control the operation of the drive object.

More particularly, the present invention may be applied to an apparatus in which the operation of the motor-driven actuator including the electric motor 5, linear solenoid, and piezo-actuator is controlled in accordance with a command signal (e.g., result of an arithmetic operation) provided from control means to control the operation of the drive object (e.g., a cam shaft in a cam phase changer, a throttle valve in an electronic throttle, or a door in a vehicular air conditioner).

What is claimed is:

1. A drive-permission apparatus comprising:
   a rotary actuator having an output shaft for outputting a rotational torque in order to actuate a shift range switching mechanism by use of an electric motor generating a rotational output when energized, the shift range switching mechanism directly or indirectly switching an actual shift range of an automatic transmission which shifts an output rotation outputted from an engine;
   angle detecting means for detecting a rotational angle of a rotor of the electric motor or a rotational angle of the output shaft of the rotary actuator;
   motor control means for controlling the operation of the electric motor to drive the shift range switching mechanism so as to change the actual shift range on the basis of the rotational angle detected by the angle detecting means;
   memory means for storing a first rotational angle which is detected by the angle detecting means when the rotary actuator is OFF;

drive inhibiting means for inhibiting a start of operation of the engine when a command for the start of operation is given to the engine and when the difference between a second rotational angle detected by the angle detecting means and the first rotational angle stored in the memory means does not satisfy a predetermined condition; and drive inhibition canceling means for canceling the inhibition of operation of the engine inhibited by the drive inhibiting means, wherein while the drive inhibiting means inhibits the start of operation of the engine, the actual shift range of the shift range switching mechanism is brought to a vehicle non-start shift range, a recognized shift range which the motor control means recognizes is brought to the vehicle non-start shift range, and when the actual shift range and the recognized shift range are coincident with each other, the drive inhibition canceling means cancels the inhibition of operation of the engine.

2. A drive-permission apparatus according to claim 1, wherein the memory means is disposed in an interior of the motor control means, and the memory means is either an Electrically Erasable Programmable Read Only Memory (EEPROM) able to store the first rotational angle even when an energization of the motor control means is stopped or a Static Random Access Memory (SRAM) able to hold the storage of the first rotational angle by receiving an electric current after the motor control means is deenergized.

3. A drive-permission apparatus according to claim 1, further comprising: fault detecting means for detecting whether the angle detecting means is at fault or not, the fault detecting means inhibiting the start of operation of the engine when a command for the start of operation is given and when the difference between the second rotational angle and the first rotational angle does not satisfy a predetermined condition or when it is detected that the angle detecting means is at fault.

4. A drive-permission apparatus according to claim 1, wherein the rotary actuator is constructed by the electric motor alone or by a combination of the electric motor and a reduction gear, the angle detecting means detects a rotational angle of the rotor of the electric motor when the rotary actuator is constructed by the electric motor alone, or the angle detecting means detects a rotational angle of the rotor of the electric motor or a rotational angle of an output shaft of the reduction gear when the rotary actuator is constructed by a combination of the electric motor and the reduction gear.

5. A drive-permission apparatus according to claim 1, wherein the angle detecting means detects the rotational angle of the output shaft of the reduction gear as a continuous quantity.

6. A drive-permission apparatus according to claim 1, further comprising: display/warning means which, when the drive inhibiting means inhibits the start of operation of the engine, provides indication or warning to a vehicle occupant that the start of operation of the engine is inhibited.

7. A drive-permission apparatus according to claim 1, further comprising: drive inhibition canceling means which, when the drive inhibiting means inhibits the start of operation of the engine, sets the actual shift range in the shift range switching mechanism to a vehicle non-start shift range, makes a recognized shift range which the motor control means recognizes and the actual shift range in the shift range switching mechanism coincident with each other so as to be the vehicle non-start shift range, and cancels the inhibition of operation of the engine inhibited by the drive inhibiting means.

8. A drive-permission apparatus according to claim 1, further comprising:

drive inhibition canceling means which, when it is detected that a vehicular braking system has been actuated while the drive inhibiting means inhibits the start of operation of the engine, sets the actual shift range in the shift range switching mechanism to a vehicle non-start shift range, makes a recognized shift range which the motor control means recognizes and the actual shift range in the shift range switching mechanism coincident with each other so as to be the vehicle non-start shift range, and cancels the inhibition of operation of the engine inhibited by the drive inhibiting means.

9. A drive-permission apparatus according to claim 1, wherein the drive inhibiting means includes display means which indicates a start inhibition canceling method to a vehicle occupant when the drive inhibiting means inhibits the start of operation of the engine.

10. A drive-permission apparatus for use in a vehicle having control means for controlling the output of a motor-driven actuator to switch an actual shift range in a shift range switching mechanism installed in a vehicular automatic transmission, the control means being energized when a command for starting an engine is given, the control means being deenergized while the engine is OFF, the drive-permission apparatus comprising:

actual shift range detecting means for detecting an actual shift range in the shift range switching mechanism;

memory means for storing a first actual shift range during stop of the supply of an electric current to the control means;

drive inhibiting means which inhibits the start of the engine when an energization of the control means is started and when a second actual shift range detected by the actual shift range detecting means and the first actual shift range stored in the memory means do not coincide with each other: and drive inhibition canceling means for canceling the inhibition of operation of the engine inhibited by the drive inhibiting means, wherein while the drive inhibiting means inhibits the start of operation of the engine, the first actual shift range of the shift range switching mechanism is brought to a vehicle non-start shift range, the second actual shift range is brought to the vehicle non-start shift range, and when the first actual shift range and the second shift range are coincident with each other, the drive inhibition canceling means cancels the inhibition of operation of the engine.

11. A drive-permission apparatus for use in an apparatus having control means for controlling the output of a motor-driven actuator to control the operation of a shift range switching mechanism of an engine, the control means being energized when a command for starting an operation is given to an engine, the control means being deenergized while the engine is not in operation, the drive-permission apparatus comprising:

actual position detecting means for detecting an actual position of the drive shift range switching mechanism;

memory means for storing a first actual position during stop of the supply of an electric current to the control means; and drive inhibiting means which inhibits the start of operation of the engine when an energization of the control means is started and when a second actual position detected by the actual position detecting means and the first actual position stored in the memory means do not substantially coincide with each other and drive inhibition canceling means for canceling the inhibition of operation of the engine inhibited by the drive inhibiting means, wherein while the drive inhibiting means inhibits the start of operation of the engine, the first actual position is brought to a vehicle non-start shift range, the second actual position is brought to the vehicle non-start shift range, and when the first actual position and the second actual position are coincident with each other, the drive inhibition canceling means cancels the inhibition of operation of the engine.

12. A method comprising:

outputting, from a rotary actuator having an output shaft, a rotational torque in order to actuate a shift range switching mechanism by use of an electric motor generating a rotational output when energized;

detecting a rotational angle of a rotor of the electric motor or a rotational angle of the output shaft of the rotary actuator;

controlling the operation of the electric motor on the basis of the detected rotational angle;

storing, in a machine-readable memory, a first rotational angle which is detected when the rotary actuator is OFF;

inhibiting a start of operation of a an engine related directly or indirectly to the shift range switching mechanism when a command for the start of operation is given to the engine and when the difference between a second detected rotational angle and the first rotational angle stored in the machine readable memory does not satisfy a predetermined condition;

canceling the inhibition of operation of the engine;

while the start of operation of the engine is inhibited, the second rotational angle is brought to a vehicle non-start shift range;

the second rotational angle is brought to the vehicle non-start shift range; and when the first rotational angle and the second rotational angle are coincident with each other, the inhibition of operation of the engine is cancelled.

13. A method according to claim 12, wherein the machine readable memory is disposed in an interior of a motor controller which performs said controlling, and the machine readable memory is either an Electrically Erasable Programmable Read Only Memory (EEPROM) able to store the first rotational angle even when an energization of the motor controller is stopped or a Static Random Access Memory (SRAM) able to hold the storage of the first rotational angle by receiving an electric current after the motor controller is deenergized.

14. A method according to claim 12, further comprising:

detecting whether said detecting the rotational angle is at fault or not, and inhibiting the start of operation of the engine when a command for the start of operation is given and when the difference between the second rotational angle and the first rotational angle does not satisfy a predetermined condition or when it is detected that said detecting the rotational angle is at fault.

15. A method according to claim 12, wherein the rotational angle of the output shaft of the reduction gear is detected as a continuous quantity.

* * * * *